(12) United States Patent
Kinrot et al.

(10) Patent No.: US 6,452,683 B1
(45) Date of Patent: *Sep. 17, 2002

(54) OPTICAL TRANSLATION MEASUREMENT

(75) Inventors: Opher Kinrot, Raanana; Uri Kinrot, Hod-Hasharon; Gilad Lederer, Tel-Aviv, all of (IL)

(73) Assignee: OTM Technologies Ltd., Herzelia (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/264,409

(22) Filed: Mar. 8, 1999

(30) Foreign Application Priority Data

Mar. 9, 1998 (WO) .................................. PCT/IL98/00113

(51) Int. Cl.[7] .................................................. G01B 9/02
(52) U.S. Cl. ...................................................... 356/499
(58) Field of Search ................................ 356/499, 28.5, 356/355, 357, 505, 521; 250/237 G

(56) References Cited

U.S. PATENT DOCUMENTS

| | | |
|---|---|---|
| 2,772,479 A | 12/1956 | Doyle |
| 3,419,330 A | 12/1968 | Schneider |
| 3,432,237 A | 3/1969 | Flower et al. |
| 3,511,150 A | 5/1970 | Whitney et al. |
| 3,737,233 A | 6/1973 | Blau et al. |
| 3,856,403 A | 12/1974 | Maughmer et al. |
| 3,888,589 A | 6/1975 | Swift |
| 4,148,585 A | 4/1979 | Bargeron et al. |
| 4,188,124 A | 2/1980 | Jaerisch et al. |
| 4,635,059 A | 1/1987 | Ball |
| 4,794,384 A | 12/1988 | Jackson |
| 5,064,280 A | 11/1991 | Ringens et al. |
| 5,100,230 A | 3/1992 | Brownrigg et al. |
| 5,148,229 A | 9/1992 | Wiseall |
| 5,159,406 A | 10/1992 | Adler et al. |
| 5,274,361 A | 12/1993 | Snow |

(List continued on next page.)

FOREIGN PATENT DOCUMENTS

| | | |
|---|---|---|
| DE | 26 36 211 B1 | 6/1977 |
| DE | 42 19 887 C1 | 11/1993 |
| DE | 196 15 568 | 11/1996 |
| EP | 0 479 759 A1 | 9/1991 |
| EP | 0 614 086 A1 | 9/1994 |
| GB | 2 043 387 | 10/1980 |
| JP | 6-258437 | 3/1993 |
| JP | 7-120554 | 10/1993 |
| JP | 08285874 | 11/1996 |
| WO | WO 86/06845 | 11/1986 |
| WO | WO 88/07208 | 9/1988 |
| WO | WO 96/02009 | 1/1996 |
| WO | WO 97/43607 | 11/1997 |

OTHER PUBLICATIONS

Quercioli, F. et al.; "Correlation Optical Velocimetry with a Compact Disk Pickup"; Applied Optics; vol. 36; No. 25; Sep. 1, 1997; pp. 6372–6375.

(List continued on next page.)

Primary Examiner—Frank G. Font
Assistant Examiner—Andrew H. Lee
(74) Attorney, Agent, or Firm—Fenster & Company Patent Attorneys Ltd.

(57) ABSTRACT

A method for determining the relative motion of a surface with respect to a measurement device, comprising:

illuminating the surface with incident illumination, having a coherence length, such that the illumination is reflected from portions of the surface, wherein at least part of at least one of the incident and reflected illumination passes through a partially transmitting object that is part of the measuring device;

detecting the illumination reflected from the surface, to generate a detected signal; and determining the relative motion of the surface parallel to the surface, from the detected signal, wherein the object and the surface are situated within a distance that is less than the coherence length of the detected illumination.

31 Claims, 7 Drawing Sheets

U.S. PATENT DOCUMENTS

| | | | |
|---|---|---|---|
| 5,459,570 | A | 10/1995 | Swanson et al. |
| 5,557,396 | A | 9/1996 | Ishizuka et al. |
| 5,587,785 | A | 12/1996 | Kato et al. |
| 5,588,437 | A | 12/1996 | Byrne et al. |
| 5,610,705 | A | 3/1997 | Brosnan et al. |
| 5,829,009 | A | 10/1998 | Frazier |
| 5,977,539 | A * | 11/1999 | Holzapfel et al. ...... 250/237 G |
| 6,246,482 | B1 * | 6/2001 | Kinrot et al. ............... 356/499 |

OTHER PUBLICATIONS

Popov and Veselove; "Tangential Velocity Measurement of Diffuse Object by Using Modulated Dynamic Speckle"; SPIE 0–8194–2264–9/96.

Matsubara et al; "Simutaneous Measurement of the Velocity and the Displacement of the Moving Rough Surface by a Laser Doppler Velocimeter"; Applied Optics; 36; p. 4516; 1997.

Izatt et al; "In Vivio Bidirectional Color Doppler Flow Imaging of Picoliter Blood Volumes Using Optical Coherence Tomography"; Optics Letters 22; p. 1439; 1997.

Suhara et al; "Monolithic Integrated–Optic Position/Displacement Sensor Using Waveguide Gratings and QW–DFB Laser"; IEEE Photonics Technology Letters; vol. 7; No. 10, Oct. 1995.

Li and Argua; "Velocity Sensing by Illumination with a Laser—Beam Pattern"; Applied Optics 33; No. 13; May 1993; p. 2320.

Laser Speckle and Related Phenomena; edited by J.C. Dainty; 1975; Chapter 6; pp. 203–205.

Lin & Kuo; Development of a New Optical Scale System by the Diffractive Phase Interference Method; Meas. Sci. Technol. (1995) 293–296.

Abstract of JP 59083075A; Published May 14, 1984.

* cited by examiner

OPTICAL TRANSLATION MEASUREMENT

FIELD OF THE INVENTION

The present invention is related to the field of velocity and translation measurement and more particularly to methods and apparatus for the non-contact optical measurement translation and velocity.

BACKGROUND OF THE INVENTION

Various optical methods for the measurement of the relative velocity and/or motion of an object with respect to a measurement system exist. Each method and apparatus is characterized by the kinds of objects and the kinds of motions on which it operates.

The kind of measurable objects may be broadly divided into several groups, including:

A specially patterned object, for example, a scale.

A reflecting surface, for example, a mirror.

A small particle (or few particles), for example precursor particles or bubbles suspended in fluid.

An optically contrasting surface, for example, a line or dot pattern.

An optically diffuse object, for example, blank paper.

The kind of measurable motions may be broadly divided into several groups, including:

Axial movement toward or away from the measuring device.

Transverse (or tangential) motion, where the spacing between the measuring device and the object is essentially constant.

Rotational motion, where the object orientation with respect to the measurement device is changing.

It is also useful to classify the measurement devices according to the number of simultaneously obtainable measurement directions (one, two or three dimensional) and the number of critical components (light sources, light detectors, lenses, etc.).

It should be noted that a specific method may be related to more than one group in the above classification schemes.

A number of systems capable of non-contact measurement of the transverse velocity and/or motion of objects using optical means have been reported. These methods can include Speckle Velocimetry methods and Laser Doppler Velocimetry methods. Other methods of interest for understanding the present invention are Image Velocimetry methods, homodyne/heterodyne Doppler Velocimetry or Interferometry methods and Optical Coherence Tomography (OCT).

Speckle Velocimetry methods are generally based on the following operational principles:

A coherent light source illuminates the object the motion of which needs to be measured.

The illuminated object (generally an opaque surface) consists of multiple scattering elements, each with its own reflection coefficient and phase shift relative to the other scattering elements.

The individual reflection coefficients and phase shifts are substantially random. At a particular point in space, the electric field amplitude of the reflection from the object is the vector sum of the reflections from the illuminated scattering elements, with an additional phase component that depends on the distance between the point and each element.

The light intensity at a point will be high when contributions generally add in phase and low when they generally add out of phase (i.e., subtract).

On a planar surface (as opposed to a point), an image of random bright and dark areas is formed since the relative phase retardation of the source points depends on the location in the plane. This image is called a "speckle image," composed of bright and dark spots (distinct "speckles").

The typical "speckle" size (the typical average or mean distance for a significant change in intensity) depends primarily on the light wavelength, on the distance between the object and the speckle image plane and on the size of the illuminated area.

If the object moves relative to the plane in which the speckle image is observed, the speckle image will move as well, at essentially the same transverse velocity. (The speckle image will also change since some scatterers leave the illuminated area and some enter it).

The speckle image is passed through a structure comprising a series of alternating clear and opaque or reflecting lines such that the speckle image is modulated. This structure is generally a pure transmission grating, and, ideally is placed close to the detector for maximum contrast.

The detector translates the intensity of the light that passes through the structure to an electrical signal which is a function of the intensity (commonly a linear function).

When the object moves with respect to the measuring device, the speckle image is modulated by the structure such that the intensity of light that reach the detector is periodic. The period is proportional to the line spacing of the structure and inversely proportional to the relative velocity.

By proper signal analysis, the oscillation frequency can be found, indicating the relative velocity between the object and the measurement device.

For these methods high accuracy frequency determination requires a large detector while high contrast in the signal requires a small detector. A paper by Popov & Veselov, entitled "Tangential Velocity Measurements of Diffuse Objects by Using Modulated Dynamic Speckle" (SPIE 0-8194-2264-9/96), gives a mathematical analysis of the accuracy of speckle velocimetry.

U.S. Pat. No. 3,432,237 to Flower, el. al. describes a speckle velocimetry measuring system in which either a transmission pattern or a pin hole is used to modulate the speckle image. When the pin-hole is used, the signal represents the passage of individual speckles across the pin hole.

U.S. Pat. No. 3,737,233 to Blau et. al. utilizes two detectors in an attempt to solve the problem of directional ambiguity which exists in many speckle velocimetric measurements. It describes a system having two detectors each with an associated transmission grating. One of the gratings is stationary with respect to its detector and the other moves with respect to its detector. Based on a comparison of the signals generated by the two detectors, the sign and magnitude of the velocity may be determined.

U.S. Pat. No. 3,856,403 to Maughmer, et al. also attempts to avoid the directional ambiguity by providing a moving grating. It provides a bias for the velocity measurement by moving the grating at a velocity higher then the maximum expected relative velocity between the surface and the velocimeter. The frequency shift reduces the effect of changes in the total light intensity (DC and low-frequency component), thus increasing the measurement dynamic range and accuracy.

PCT publication WO 86/06845 to Gardner, et al. describes a system designed to reduce the amplitude of DC and low frequency signal components of the detector signal by subtracting a reference sample of the light from the source from the speckle detector signal. The reference signal is proportional to the total light intensity on the detector, reducing or eliminating the influence of the total intensity variations on the measurement.

This reference signal is described as being generated by using a beam-splitter between the measured surface and the primary detector by using the grating that is used for the speckle detection also as a beam-splitter (using the transmitted light for the primary detector and the reflected light for the reference detector) or by using a second set of detectors to provide the reference signal. In one embodiment described in the publication the two signals have the same DC component and opposite AC components such that the difference signal not only substantially removes the DC (and near DC) components but also substantially increases the AC component.

In U.S. Pat. No. 4,794,384, Jackson describes a system in which a speckle pattern reflected from the measured surface is formed on a 2 D CCD array. The surface translation in 2 dimensions is found using electronic correlation between successive images. He also describes an application of his device for use as a "padless optical mouse."

Image velocimetry methods measure the velocity of an image across the image plane. The image must include contrasting elements. A line pattern (much like a grating) space-modulate the image, and a light-sensitive detector is measuring the intensity of light that pass through the pattern. Thus, a velocity-to-frequency relation is formed between the image velocity and the detector AC component. Usually, the line pattern moves with respect to the detector so that the frequency is biased. Thus, the direction ambiguity is solved and the dynamic range expanded.

A paper by Li and Aruga, entitled *"Velocity Sensing by Illumination with a Laser-Beam Pattern"* (*Applied Optics*, 32 p.2320, 1993) describes image velocimetry where the object itself is illuminated by a periodic line structure (instead of passing its image through such a pattern). The line pattern is obtained by passing an expanded laser beam through periodic transmission grating (or line structure). According to the suggested method the object still needs to have contrasting features.

There exist a number of differences between Image Velocimetry (IV) and Speckle Velocimetry (SV). In particular, in SV the random image is forced by the coherent light source, whereas in IV an image with proper contrasting elements is already assumed. Furthermore, in SV the tangential velocity of the object is measured, whereas in IV the angular velocity is measured (the image velocity in the image plane is proportional to the angular velocity of the line of sight).

In U.S. Pat. No. 3,511,150 to Whitney et. al., two-dimensional translating of line patterns creates a frequency shift. A single rotating circular line pattern creates all the necessary translating line patterns at specific elongated apertures in a circular mask. The frequency shift is measured on-line using an additional detector measuring a fixed image. The line pattern is divided to two regions, each one adapted for the measurement of different velocity range. The system is basically intended for image motion compensation in order to reduce the image blur in aerial photography. Also, it is useful for missile homing heads.

U.S. Pat. No. 2,772,479 to Doyle describes an image velocimetry system with a frequency offset derived from a grating on a rotating belt.

Laser Doppler Velocimeters generally utilize two laser beams formed by splitting a single source which interfere at a known position. A light-scattering object that passes through the interfering space scatters light from both beams to a detector. The detector signal includes an oscillating element with frequency that depends on the object velocity. The phenomena can be explained in two ways. One explanation is based on an interference pattern that is formed between the two beams. Thus, in that space the intensity changes periodically between bright and dark planes. An object passing through the planes scatters the light in proportion to the light intensity. Therefore, the detected light is modulated with frequency proportional to the object velocity component perpendicular to the interference planes. A second explanation considers that an object passing through the space in which both light beams exist, scatters light from both. Each reflection is shifted in frequency due to the Doppler effect. However, the Doppler shift of the two beams is different because of the different angles of the incident beams. The two reflections interfere on the detector, such that a beat signal is established, with frequency equal to the difference in the Doppler shift. This difference is thus proportional to the object velocity component perpendicular to the interference planes.

It is common to add a frequency offset to one of the beams so that zero object velocity will result in a non-zero frequency measurement. This solves the motion direction ambiguity (caused by the inability to differentiate between positive and negative frequencies) and it greatly increases the dynamic range (sensitivity to low velocities) by producing signals far from the DC components. The frequency offset also has other advantages related to signal identification and lock-on.

U.S. Pat. No. 5,587,785 to Kato, et. al. describes such a system. The frequency offset is implemented by providing a fast linear frequency sweep to the source beam before it is split. The method of splitting is such that a delay exists between the resulting beams. Since the frequency is swept, the delay results in a fixed frequency difference between the beams.

Multiple beams with different frequency offsets can be extracted by further splitting the source with additional delays. Each of these delays is then used for measuring a different velocity dynamic range.

A paper by Matsubara, et al., entitled *"Simultaneous Measurement of the Velocity and the Displacement of the Moving Rough Surface by a Laser Doppler Velocimeter"* (*Applied Optics*, 36, p. 4516, 1997) presents a mathematical analysis and simulation results of the measurement of the transverse velocity of a rough surface using an LDV. It is suggested that the displacement along the axial axis can be calculated from measurements performed simultaneously by two detectors at different distances from the surface.

In Homodyne/Heterodyne Doppler Measurements, a coherent light source is split into two beams. One beam (a "primary" beam) illuminates an object whose velocity is to be measured. The other beam (a "reference" beam) is reflected from a reference element, usually a mirror, which is part of the measurement system. The light reflected from the object and from the reference element are recombined (usually by the same beam splitter) and directed to a light-sensitive detector.

The frequency of the light reflected from the object is shifted due to the Doppler effect, in proportion to the object velocity component along the bisector between the primary beam and the reflected beam. Thus, if the reflected beam coincides with the primary beam, axial motion is detected.

The detector is sensitive to the light intensity, i.e.—to the square of the electric field. If the electric field received from the reference path on the detector is $E_0(t)=E_0 \cos(\omega_0 t+\phi_0)$ and the electric field received from the object on the detector is $E_1(t)=E_1 \cos(\omega_1 t+\phi_1)$, then the detector output signal is proportional to $(E_0+E_1)^2 = E_0^2 + E_0 E_1 + E_1^2$.

The first term on the right side of the equation is averaged by the detector time-constant and results in a DC component. The intensity of the reference beam is generally much stronger than that of the light reaching the detector from the object, so the last term can usually be neglected. Developing the middle term:

$$E_0 E_1 = E_0 E_1 \cos(\omega_0 t+\phi_0)\cos(\omega_1 t+\phi_1) = \tfrac{1}{2} E_0 E_1 [\cos((\omega_0+\omega_1)t+\phi_0+\phi_1)+\cos((\omega_0-\omega_1)t+\phi_0-\phi 1)]$$

From this equation it is evident that $E_0 E_1$ includes two oscillating terms. One of these terms oscillates at about twice the optical frequency, and is averaged to zero by the detector time-constant. The second term oscillates with frequency $\omega_0-\omega_1$, i.e.—with the same frequency as the frequency shift due to the Doppler effect. Thus, the detector output signal contains an oscillating component with frequency indicative of the measured velocity.

It is common to add a frequency offset to the reference beam. When such a frequency bias is added, it is termed Heterodyne Detection.

U.S. Pat. No. 5,588,437 to Byrne, et al. describes a system in which a laser light source illuminates a biological tissue. Light reflected from the skin surface serves as a reference beam for homodyne detection of light that is reflected from blood flowing beneath the skin. Thus, the skin acts as a diffused beam splitter close to the measured object. An advantage of using the skin as a beam splitter is that the overall movement of the body does not effect the measurement. Only the relative velocity between the blood and the skin is measured.

The arrangement uses two pairs of detectors. Each pair of detectors is coupled to produce a difference signal. This serves to reduce the DC and low-frequency components interfering with the measurement. A beam scanning system enables mapping of the two-dimensional blood flow.

In Optical Coherence Tomography (OCT), a low-coherence light source ("white light") is directed and focused to a volume to be sampled. A portion of the light from the source is diverted to a reference path using a beam-splitter. The reference path optical length is controllable. Light reflected from the source and light from the reference path are recombined using a beam-splitter (conveniently the same one as used to split the source light). A light-sensitive detector measures the intensity of the recombined light. The source coherence length is very short, so only the light reflected from a small volume centered at the same optical distance from the source as that of the reference light coherently interferes with the reference light. Other reflections from the sample volume are not coherent with the reference light. The reference path length is changed in a linear manner (generally periodically, as in sawtooth waveform). This allows for a sampling of the material with depth. In addition a Doppler frequency shift is introduced to the measurement, allowing for a clear detection of the coherently-interfering volume return with a high dynamic range.

In conventional OCT, a depth profile of the reflection magnitude is acquired, giving a contrast image of the sampled volume. In more advanced OCT, frequency shifts, from the nominal Doppler frequency, are detected and are related to the magnitude and direction of relative velocity between the sampled volume (at the coherence range) and the measurement system.

U.S. Pat. No. 5,459,570 to Swanson, et al. describes a basic OCT system and numerous applications of the system.

A paper by Izatt et al., entitled *"In Vivo Bidirectional Color Doppler Flow Imaging of Picoliter Blood Volumes Using Optical Coherence Tomography"* (*Optics Letters* 22, p.1439, 1997) describes an optical-fiber-based OCT with a velocity mapping capability. An optical-fiber beam-splitter is used to separate the light paths before the reflection from the sample in the primary path and from the mirror in the reference path and combine the reflections in the opposite direction.

A paper by Suhara et al., entitled *"Monolithic Integrated-Optic Position/Displacement Sensor Using Waveguide Gratings and QW-DFB Laser"* (*IEEE Photon. Technol. Lett.* 7 p.1195, 1995) describes a monolithic, fully integrated interferometer, capable of measuring variations in the distance of a reflecting mirror from the measuring device. The device uses a reflecting diffraction element (focusing distributed Bragg reflector) in the light path from the source as a combined beam-splitter and local oscillator reflector. Direction detection is achieved by an arrangement that introduces a static phase shift between signals of the detectors.

Each of the above referenced patents, patent publications and references is incorporated herein by reference.

SUMMARY OF THE INVENTION

The present invention in its broadest form provides an Optical Translation Measurement (OTM) method and device, capable of providing information indicative of the amount and optionally the direction of relative translation between the device and an adjacent object. Preferably, the object is at least partly rough and is closely spaced from the device. As used herein, the terms "rough" or "diffuse" mean optically irregular or non-uniform. In particular, the object may have a diffuse opaque or semi-transparent surface such as a paper. This specification deals mainly with determining the translation or velocity of such diffuse surfaces. However, it should be understood that many of the methods of the invention may also be applicable to determination of translation of other types of objects such as small scattering particles, possibly suspended in fluid. Translation of the object means that its rotation in space may be neglected.

In a first aspect of some preferred embodiments thereof, the invention provides heterodyne or homodyne detection of non-Doppler, non-speckle-image signals derived from changes in the phase and/or the amplitude of reflection from an optically irregular surface.

In a second aspect of some preferred embodiments of the invention, applicable to various methods of motion or velocity detection, a system is provided in which a reflector which reflects part of the incident light is placed next to the surface whose motion is to be measured. The reflector provides a local oscillator signal which is inherently coherent with the light which is reflected from the surface. This aspect of the invention is applicable to both Doppler and non-Doppler methods of motion detection.

In a preferred embodiment of the invention, the partial reflector is an apertured reflector in which the illumination of the surface whose motion is measured pass through the aperture. In a preferred embodiment of the invention, the partial reflector covers a portion of the measured surface and has a substantial amount of transmission. In this preferred embodiment of the invention, the reflections from the surface pass through the partial reflector. A combination of apertureing and partial transmission is often useful, especially in preferred embodiments of the invention which utilize the third aspect of the invention.

In a third aspect of some preferred embodiments of the invention, a non-symmetrical transmission pattern is provided to aid in determining the direction of motion of the surface.

In a fourth aspect of some preferred embodiments of the invention, a phase shift is introduced between the reflection from the partial reflector and the reflection from the surface. This phase shift enables the determination of the direction of motion, increases the dynamic range and improves the signal-to-noise ratio.

This phase shift may, in some preferred embodiments of the invention, be dynamic, i.e., time varying. Such phase variations are conveniently performed by moving the reflector either perpendicularly to the surface or parallel to the surface or a combination of both. Also, the movement may be of a pattern on the reflector, e.g.—the movement of a standing wave acting as a grating in a Surface Acoustic Wave (SAW) component. In this respect it is the pattern on the reflector that moves, and not the whole reflector. Alternatively, the phase shift is introduced by periodically varying the optical path length between the reflector and the surface, e.g. by inserting a piezo-electric material in the optical path.

The phase shift may also be a static phase shift. Conveniently, this static phase shift is accompanied by a change in polarization of one of the beams (or a part of the energy in the beam). The direction of motion is determined by a measurement of the phase change and more particularly by measurement of the sign of the phase change. In a preferred embodiment of the invention, the phase of a portion of a beam whose phase is not changed is compared with the phase of a portion which is changed, to determine the direction of motion.

A fifth aspect of some preferred embodiments of the invention provides for Doppler based detection of motion of a surface in a direction parallel to the surface. In this aspect of the invention, a single beam may be incident at an angle to the surface or even perpendicular to the surface.

A sixth aspect of some preferred embodiments of the invention provides for simultaneous two or three dimensional translation detection using a single illuminating beam and a single reflector to provide local oscillator reference beams. In a preferred embodiment of the invention, the signal generated by a single detector is used to determine the translation in two dimensions.

In a seventh aspect of some preferred embodiments of the invention, only a single spatial frequency of the light reflected from the surface is utilized in measurement. Preferably, a spatial filter is provided such that the illumination is reflected from the surface such that substantially only a single spatial frequency of the reflected radiation is detected by the detector.

In some preferred embodiments of the invention which incorporate this aspect of the invention, the spatial filter comprises a lens having a focal point and a pinhole which is placed at the focal point of the lens.

Preferably, the illumination of the surface is collimated and the spatial filter filters the reflected illumination such that only radiation reflected from the surface substantially in a single direction is detected by the detector.

A device, according to a preferred embodiment of the invention, includes a light source, a grating, a spatial filter, a photo-detector, and signal processing electronics. The light source provides at least partially coherent radiation, which is directed toward the surface. An optical grating is placed between the surface and the light source, preferably close to the surface. The light reflected from the surface interferes with the light that is reflected from the grating itself. The detector signal includes an oscillating component, that is representative of the surface translation relative to the optical device. The interference may take place with the normal reflection from the grating or with light diffracted at any of the grating orders. Most preferably, the light passes through a spatial filter prior to detection by the detector. Two dimensional translation measurement may be achieved by using orthogonal reflection orders from a two-dimensional grating or by utilizing two separate gratings for the two directions. A third dimension may be deduced by vector calculation of the translations measured in two different orders at the same axis (e.g.—0 and 1, 1 and 2, −1 and 1, etc.), or without an additional detector, simultaneously using different signal analysis techniques on the same signal.

Optional detection of the direction of translation (as opposed to it's absolute magnitude) is preferably achieved by modulating the grating position to provide a frequency offset. Alternatively, a varying optical path length between the grating and the surface introduces the frequency offset. Alternatively, an asymmetric pattern for the grating transmission and appropriate signal manipulation/processing may be used. Alternatively, the direction may be determined by other means.

The method and device of the invention are applicable to a wide range of applications that require measurement of translation. One such application is a "padless optical mouse", that can effectively control a cursor movement by moving the mouse across an optically diffuse surface such as a paper or a desk-top. Another exemplary application for the invention is for a "touch-point", that translates finger movement over a device aperture to control a cursor or any other translation or velocity controlled entity.

In accordance with a preferred embodiment of the invention, the measurement apparatus comprises a light source for providing at least partially coherent radiation. The source radiation is directed toward an optical one-dimensional or two-dimensional grating, which is preferably close to the reference surface. The light reflections from the grating and from the surface interfere, and the light is collected through a spatial filter (for example, a lens and a pin-hole at its focal point) into a light-detector. The resulting interference signal contains beats related to the relative translation of the optical apparatus and the surface. Counting the "zero crossings" of the oscillating detector signal performs direct measurement of the amount of translation. In preferred embodiments of the invention, the translation is measured directly by counting zero crossings and is thus not subject to errors caused by velocity changes. For preferred embodiments of the invention, substantially instantaneous position determination is established.

In many applications the translation direction as well as its magnitude is required. In a preferred embodiment of the invention this is accomplished by incorporating a phase shifting device (such as a piezoelectric transducer) which creates an asymmetric phase shift pattern (typically a saw-tooth waveform) between the light reflected from the grating and from the surface, enabling simple extraction of the direction information. Alternatively, direction detection is accomplished by using a preferably specially-designed asymmetric transmission pattern for the grating/matrix (such as a saw-tooth transmission or other form as described herein) with appropriate signal processing/manipulation on the detector output signal. An asymmetric transmission pattern provides means for motion direction detection in other velocimetry methods as well, such as speckle velocimetry.

A speckle-free, coherent detection of translation may be determined by collecting the scattered light (the light which passes through the grating and is reflected from the moving surface) with a spatial filter, such as a combination of a focusing lens and a pinhole aperture (or single mode optical fiber) at the focal position of the lens. The light reflected from the surface is combined with a local oscillator light field (which is preferably the light reflected or diffracted by the grating itself), which field is preferably a part of the light beam that also passes through the spatial filter. The interference with the strong local oscillator light source provides amplification of the detected signal by an intensity-sensitive photodetector. This coherent detection method is termed homodyne detection.

The spatial filter is operative to spatially integrate light reflected from the surface to a detector, such that the relative phases of the reflections from different locations on the surface are essentially unchanged when the surface moves with respect to the detector. Furthermore, the phase of a scatterer on the surface (as measured at the detector) depends linearly on the surface translation. Also, the spatial filter is ideally used to filter the local oscillator such that the detector will integrate over no more than a single interference fringe resulting from the interference between the local oscillator and the light reflected from the surface.

In one extreme case, the light incident on the surface is perfectly collimated (i.e.—it is a plane wave). Thus, the spatial filter may simply be a lens with a pinhole positioned at it's focal point. Any translation of the surface does not change the relative phases of the light integrated by the spatial filter. The local oscillator formed by the reflection or the diffraction from the reflector or grating is also perfectly collimated, so that it can also be passed through the spatial filter (the spatial filter is positioned such that the image of the source falls on or within the pin-hole). This forces a single interference fringe on the detector. No limitations are imposed (with regard to spatial filtering) on the spacing between the reflector and the surface.

In another extreme case, the spacing between the surface and the reflector is negligible. This allows for the use of a substantially non-collimated incident beam while still maintaining the relative phases of the reflections from the surface irrespective of it's translation and also maintaining the same focusing point for the local oscillator and the reflection from the surface. Optionally, the spatial filter may be implemented with a lens and a pinhole positioned at the image plane of the reflection of the source as a local oscillator.

In order to have (at most) a single speckle integrated by the detector, the pinhole size should not exceed the size of about a single speckle formed by the reflection from the surface (for this reason, the measurement may be termed "speckle-free"). Thus, if the detector itself is small enough, it may serve as an integral part of the spatial filter and a pin-hole is not required.

The requirements of unchanged relative phases and single interference fringe with the local oscillator at the detector can be fulfilled in a multitude of optically equivalent ways. In particular, the requirement may be established using a single converging lens positioned before or after the reflection of the light from the reflector. Alternatively, the lens and the reflector can be combined in a single optical device. Also, a collimating lens may be positioned between the beamsplitter and the surface (i.e.—only light to and from the surface pass through this lens).

Non-ideal spatial filtering (as when the pin hole is too large, or when it is out of focus for either the reflection from the surface or the local oscillator or both), results in deterioration of the signal and possibly the addition of noise to the measurement. The level of deterioration depends on the amount and kind of deviation from the ideal.

In a preferred method according to the present invention, both the surface illumination and the reference light are provided using a single optical element, preferably a grating. The surface and reference light share a single optical path through all of the optical elements in the device. Moreover, the spatial amplitude and/or phase modulation, imposed on the light reaching the surface by the grating, provide additional means for measuring the surface's translation. In particular, tangential translation can be measured even for specular reflection from the grating, where no Doppler shift exists, and identification of the direction of motion can also be achieved.

There is thus provided, in accordance with a preferred embodiment of the invention, a method for determining the relative motion of a surface with respect to a measurement device, comprising:

illuminating the surface with incident illumination having a coherence length such that the illumination is reflected from portions of the surface, wherein at least part of at least one of the incident and reflected illumination passes through a partially transmitting object that is part of the measuring device;

detecting the illumination reflected from the surface, to generate a detected signal; and determining the relative motion of the surface parallel to the surface, from the detected signal, wherein the object and the surface are situated within a distance that is less than the coherence length of the detected illumination;

Preferably, the transmission of the object is spatially varying, more preferably, periodic spatially varying.

Preferably, the object is partially reflecting, part of the incident illumination is reflected or diffracted by the object, as a reference illumination and detection of the illumination is coherent, utilizing said reference illumination.

There is further provided, in accordance with a preferred embodiment of the invention, a method for determining the relative motion of a surface with respect to a measurement device comprising:

placing a partially reflecting object, which is part of the measuring device, adjacent to the surface;

illuminating the object with incident illumination such that part of the incident illumination is reflected or diffracted by the object, as a reference illumination and part is reflected from the surface;

coherently detecting the illumination reflected from the surface utilizing the reference illumination, to generate a detected signal; and determining the relative motion of the surface parallel to the surface, from the detected signal.

Preferably, the object is a partially transmitting object and at least part of at least one of the incident and reflected illumination passes through the object.

Preferably, the reflection of the object is spatially varying, preferably periodically spatially varying.

In a preferred embodiment of the invention, the object is a grating. Preferably, the grating is placed sufficiently close to the surface such that the surface is in the near field of the grating. Alternatively, the grating is placed sufficiently far from the surface such that the surface is outside the near field of the grating.

In a preferred embodiment of the invention, the detected illumination is at least partly coherent.

There is further provided, in accordance with a preferred embodiment of the invention, a method for determining the relative motion of a surface with respect to a measurement device comprising:

placing an object comprising a grating, which is part of the measuring device, adjacent to the surface;

illuminating the grating with incident illumination such that at least part of the illumination is incident on and reflected from the surface, wherein at least one of the incident and reflected illumination passes through the grating;

detecting the illumination reflected from the surface;

generating a signal in response to the reflected illumination; and determining the relative motion of the surface parallel to the surface, from the detected signal, wherein the surface is in the near field of the grating.

In a preferred embodiment of the invention, the illumination reflected from the surface is frequency shifted from that of the illumination reflected from or diffracted by the object and wherein determining the motion comprises determining the motion based on the frequency shift.

In a preferred embodiment of the invention, determining the motion comprises determining variations in the amplitude of the signal with position. Preferably, the motion is determined from zero crossings of the detected signal.

In a preferred embodiment of the invention, the object has a transmission characteristic that is spatially non-symmetric and the method includes determining the direction of the relative motion based on the detected signal.

In a preferred embodiment of the invention, the method includes determining the magnitude and direction of the translation utilizing two detectors which produce different detected signals depending on the direction of the translation. Preferably, the method includes determining the direction of translation from the sign of a phase difference between the different detected signals.

In a preferred embodiment of the invention, the illumination is perpendicularly incident on the surface.

In a preferred embodiment of the invention, the surface is an optically diffusely reflecting surface.

In a preferred embodiment of the invention, the surface has no markings indicating position.

In a preferred embodiment of the invention, the illumination comprises visible illumination. Alternatively or additionally, the illumination comprises infra-red illumination.

Preferably, the method includes determining motion in two dimensions transverse to the surface. Preferably, the method includes determining motion in a direction perpendicular to the surface.

There is further provided, in accordance with a preferred embodiment of the invention, a scanner for reading a document by movement of the scanner over the document comprising:

an optical reading head which detects patterns on the surface of the document; and an optical detector which determines the motion of the scanner as it is translated across the surface of the document, wherein the optical detector utilizes the method of the invention to determine the translation.

There is further provided, in accordance with a preferred embodiment of the invention, an optical mouse comprising:

a housing having an aperture facing a surface; and an optical motion detector which views the surface through the aperture, wherein the optical motion detector utilizes the method of the invention to determine the translation of the housing with respect to the surface.

BRIEF DESCRIPTION OF THE DRAWINGS

The present invention will be more clearly understood from the following description of the preferred embodiments of the invention read in conjunction with the attached drawings in which.

DETAILED DESCRIPTION OF PREFERRED EMBODIMENTS OF THE INVENTION

Figure 1:
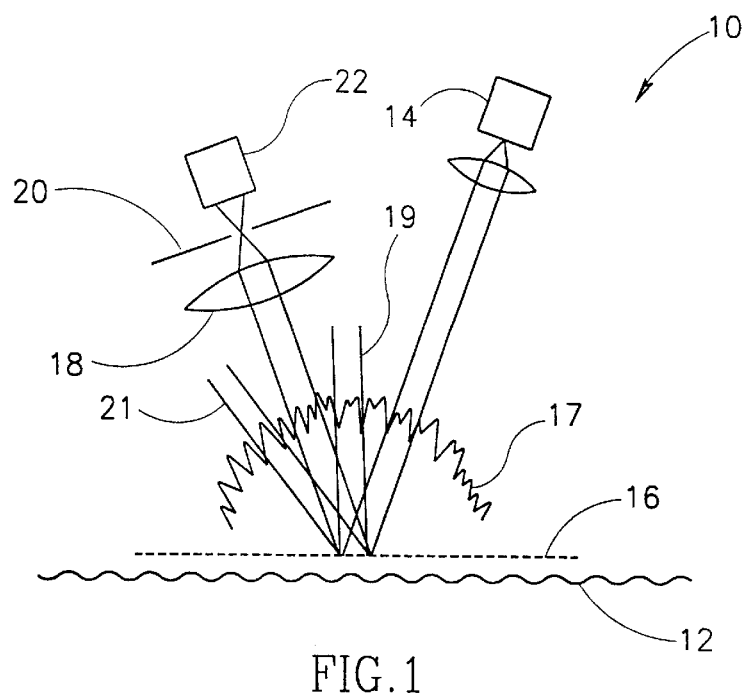
FIG. 1 is a schematic representation of a preferred embodiment of a motion transducer, in accordance with a preferred embodiment of the invention.

FIG. 1 shows apparatus 10 for the measurement of the translation of a surface 12, in accordance with a preferred embodiment of the invention. Apparatus 10 comprises a source of at least partially coherent, preferably collimated optical radiation 14, such as a laser. Preferably, the laser is a diode laser, for example a low power infra-red laser. While other wavelengths can be used, an infra-red laser is preferred since it results in eye-safe operation. The source is preferably collimated. However, a non-collimated source may be used if compensation as described below is used. While it is desirable to use a collimated source from depth of field considerations, the collimation need not be particularly good.

Apparatus 10 also includes a one-dimensional or two dimensional reflective grating 16 which is closely spaced from surface 12. The limitations as to spacing of grating 16 from surface 12 are described below. Light which is reflected from (or diffracted by) grating 16 and light reflected by surface 12 are both incident on a spatial filter (composed of a lens 18 and a pinhole 20) before being detected by an optical detector 22. The resulting interference gives rise to a beat signal that depends on the motion of the surface. It should be noted that this and other Figs. show an exaggerated spacing between grating 16 and surface 12, for clarity. As indicated from FIG. 1, radiation is reflected from the surface in substantially all directions. This radiation is shown only in FIG. 1 and not in the other drawings for clarity of presentation.

In FIG. 1 the light is seen as being incident on the surface from an angle; however, it is possible for the light to be incident at the normal to grating 16. Moreover, while FIG. 1 shows the incident light angle equal to the detection angle, such that light reflected from the grating (or zeroth order diffraction) is used for the local oscillator, first or higher order diffraction by the grating can be effectively used. Zero order has the advantages that it is wavelength independent (stability of the wavelength is not important). The incident light can be pulsed or continuous. In FIG. 1, light diffracted at the −1 and +1 orders are indicated by reference numbers 19 and 21 respectively. Light which is scattered by the surface is indicated by reference number 17.

In the preferred embodiment of the invention shown in FIG. 1, speckle-free, coherent detection (homodyne or heterodyne, homodyne shown in FIG. 1) is used to determine tangential motion. Such detection results in an intrinsic amplification of the signal used for measurement resulting in a high dynamic range.

The reference local oscillator field for the coherent detection is provided by reflections from grating 16, placed close to the moving surface. The interference of the reflections from the grating and the moving surface on the detector give rise to a translation dependent oscillating signal. The incorporation of a near-surface reflection from a grating as the origin of the local oscillator field may give multiple advantages, including at least some of the following:

1. The grating is a single element that combines the roles of a beam splitter and a mirror in a coherent homodyne/heterodyne detection optical setup, thus making the optical system simple, robust and with few alignment requirements.
2. The grating causes spatially periodic intensity and/or phase modulation of the illumination reflected from the surface, if the surface is placed within the near field of the grating. This enables detection of translation using the specular (zeroth order) reflection as the reference wave.
3. High order reflections ($\pm 1^{st}$, $\pm 2_{nd}$, etc.) serve as local oscillator fields for high resolution detection of the surface's translation. A translation dependent phase shift between the reference and surface waves at non-specular reflection orders produce oscillations representative of the translation.
4. Translation detection can be frequency biased by periodic shifting of the grating position (e.g. sawtooth modulation), enabling determination of direction as well as magnitude of the translation.
5. A two-dimensional grating provides reference (local oscillator) waves and modulation of the illumination of the surface and reflections from it for two orthogonal translation directions in a single element, for a full two-dimensional transverse motion measurement coverage.
6. Measurement at different grating orders provides different components of the translation or velocity vector of the surface. For specular reflection, for example, translation along the axis perpendicular to the grating can be measured independently of translation in the other directions. This allows for three dimensional translation measurement by adding the measurement or the calculation of the axial component for two measurements performed for the same transverse axis but in different grating orders.
7. Asymmetric grating transmission functions (amplitude and/or phase) enable direction detection in all reflected orders, using appropriate signal manipulation/analysis.
8. Frequency biasing using local oscillator phase shifting, in combination with the amplitude modulation resulting from the grating at near field provide for simultaneous measurement of 2-D translation (in a transverse and axial translation plane) by a single detector.

In addition to spatial filtering related restrictions, the allowed distance between the grating and the surface generally depends on the grating period Λ, the light wavelength λ, the spectral coherence width Δλ, the illuminated area and the incident and reflected beam angles.

For those preferred embodiments of the invention which utilize the light reflected or diffracted from the grating as a local oscillator, it is most preferable for the spacing between the surface 12 and the grating 16 to be smaller than the coherence length of the light, given by $\approx \lambda^2/\Delta\lambda$, where Δλ is the spectral width of radiation reaching the detector, and not necessarily the spectral width of the light source. Thus, by proper spectral filtering along the optical path, the spectral content reaching the detector can be limited and its coherence length increased, if this is necessary.

For those preferred embodiments of the invention, in which the modulated transmission pattern plays a major role in the detection scheme, the spacing between the grating and surface 12 should also be within the near-field distance from the grating, $\approx \Lambda^2/4\lambda$. For the following embodiments the spacing is assumed to be near field. This requirement is relaxed for the cases where it is not essential.

Relative motion of the surface can be measured in a number of ways. Consider the incident field and the grating field transmission function, respectively:

$$E(t)=E_0\cos(\omega_0 t) \qquad (1)$$

$$A(x) = \sum_m c_m\cos(2\pi mx/\Lambda + \psi_m) \qquad (2)$$

The grating is assumed to be a pure amplitude grating with period Λ, so that its transmission is the sum over non-negative spatial frequencies with real coefficients. A similar formalism applies also to binary phase grating, or some general phase gratings, which can also be used in the practice of the present invention. For the general case of both amplitude and phase gratings a phase retardation term is added. For simplicity of the description the following description is based on a pure amplitude grating. However, it should be understood that other gratings can be utilized. Unimportant constant factors are also omitted in various parts of the following mathematical treatment.

Plane-wave illumination by the light source over the grating area is assumed (i.e.—a collimated beam), but is not strictly necessary provided, for example, the non-collimation is compensated in another part of the system (e.g.—the spatial filter). It is assumed for simplicity that the incident light is perpendicular to the grating (and not as shown in FIG. 1). Oblique incident light (in the direction of the grating lines and/or perpendicular to it) gives substantially the same results, with shifted reflection angles. Thus, the grating field contains a series of reflected diffraction orders, arranged symmetrically about the specular reflection component (zeroth order) and obeying the angular condition (for the n-th order):

$$\sin(\alpha)=n\lambda/\Lambda \qquad (3)$$

As shown in FIG. 1, a spatial filter in front of the detector is preferably comprised of focusing lens 18 and narrow pinhole 20 at the focal point of the lens. Such a spatial filter is preferably adjusted to select only a single spatial frequency component to reach the detector. The pinhole can be replaced by a single-mode optical fiber, having a similar core diameter and leading the light to a remote detector. The spatial filter is aligned such that one of the diffraction orders reaches the detector, and serves as the local oscillator for homodyne detection of the reflected radiation, or for heterodyne detection as described below. The local oscillator field is given by:

$$E_{LO}(t) = E_n \cos(\omega_0 t + \phi_n) \quad (4)$$

The reflected field from the moving surface in the same direction as the n-th diffraction order is represented by an integral over the illuminated surface area of independent reflections from the surface. Integrating over the direction parallel to the grating lines (y) and over the direction normal to the surface (corresponding to light penetration into the surface), results in a reflected field equal to:

$$E_r(t) = E_0 \int_{x_1}^{x_2} dx A(x) r(x - p(t)) \cos(\omega_0 t + 2\pi n x / \Lambda + \phi(x - p(t))) \quad (5)$$

where $r(x)$ and $\phi(x)$ are location dependent amplitude and phase reflectance of the surface, respectively. The reflectance is assumed to be time-independent during the measurement, with both r and $\phi$ being random variables of the position x. The translation of the surface from its initial position is given by $p(t)$, with $p(0)=0$. The periodic phase term $2\pi n x/\Lambda$ arises from the reflection at an angle $\sin(\alpha) = n\lambda/\Lambda$. The integration limits are from $x_1$ to $x_2$, both determined by the illuminated area.

Changing the integration variable from x to x-p(t), corresponding to the symmetric situation of a static surface and moving grating with respect to the reference coordinate system:

$$E_r(t) = E_0 \int_{x_1 - p(t)}^{x_2 - p(t)} dx A(x + p(t)) r(x) \cos(\omega_0 t + 2\pi n p(t)/\Lambda + 2\pi n x/\Lambda + \phi(x)) \quad (6)$$

with integration limits now extending from $x_1-p(t)$ to $x_2-p(t)$ and thus being time-dependent.

Replacing A(x) with its Fourier series and writing $\phi_n(x) = \phi(x) + 2\pi n x/\Lambda$ gives:

$$E_r(t) = E_0 \int_{x_1 - p(t)}^{x_2 - p(t)} dx \sum_m c_m \cos(2\pi m x/\Lambda + 2\pi m p(t)/\Lambda + \psi_m) r(x) \cos(\omega_0 t + 2\pi n p(t)/\Lambda + \phi_n(x)) \quad (7)$$

The (optical) phase of a scatterer on the surface linearly depends on the translation p(t), with $\phi = \phi_n(x) + 2\pi n p(t)/\Lambda$. For specular reflection (n=0), the phase is a constant.

Both the reflected field and the local oscillator field reach the detector. Since the detector measures intensity, which is proportional to the square of the field, the intensity is given by:

$$I(t) = (E_{LO}(t) + E_r(t))^2 = E_{LO}(t)^2 + 2E_{LO}(t)E_r(t) + E_r(t)^2 \quad (8)$$

Assuming that the local oscillator field is much larger than the reflected field, $E_{LO} \gg E_r$ and that the detector integration time is much longer than an optical period time but much shorter than $\Lambda/nV\max$ (where $V_{max}$ is the maximum measured velocity), integration over optical frequencies gives just a DC component while other variations are detected instantaneously. Under these assumptions, the first intensity term is replaced by a constant $I_{LO} = E_{LO}^2/2$ and the third intensity term is neglected, i.e., $I_r = E_r^2/2 = 0$. In this preferred embodiment of the invention, the ratio of the strength of the local oscillator field and of the reflected field is intrinsically large, since the reflection from the grating is directed only to specific narrow orders and the reflection from the diffuse surface is scattered over a broad angle.

Although the third term is generally neglected in the following discussion, translation measurement utilizing the spatial transmission modulation is possible even if the third term alone is present, i.e., when the light reflected from the surface is not combined with a reference reflected or diffracted from the grating. This may be achieved (if desired) by selecting an angle which lies between grating orders. It does have the advantage of significantly relaxed alignment constrains (it is only required to be in the focal plane of the spatial filter), but will generally be less accurate and with a low signal-to-noise ratio.

The local oscillator field serves as a very strong amplifier in the first stage of signal detection. In this respect it is strongly preferred to keep the local oscillator field as noise-free as possible, since its noise transfers to the detected signal directly.

The measured cross term is equal to:

$$I_s(t) = E_n \cos(\omega_0 t + \omega_n) E_r(t) \quad (9)$$

Inserting the oscillating field term $\cos(\omega_0 t)$ into the integral for $E_r(t)$ and using the cosine sum relationship $\cos\alpha\cos\beta = 0.5(\cos(\alpha+\beta) + \cos(\alpha-\beta))$ for the right-most cosine in (7), results in one intensity component at twice the optical frequency ($2\omega_0$) and another with slowly varying phase. The fast oscillating component averages to zero because of the detector's time response. The remaining signal is:

$$I_s(t) = I_n \int_{x_1 - p(t)}^{x_2 - p(t)} dx \sum_m c_m \cos(2\pi m x/\Lambda + 2\pi m p(t)/\Lambda + \psi_m) r(x) \cos(2\pi n p(t)/\Lambda + \phi_n(x) - \varphi_n) \quad (10)$$

Exchanging summation with integration, the contribution of each term to the sum is:

$$I_{s,m}(t) = I_n c_m \int_{x_1 - p(t)}^{x_2 - p(t)} dx \cos(2\pi m x/\Lambda + 2\pi m p(t)/\Lambda + \psi_m) r(x) \cos(2\pi n p(t)/\Lambda + \phi_n(x) - \varphi_n) \quad (11)$$

The grating has a period $\Lambda$. The average transmission of the grating is given by the m=0 term in the expansion. Consider the requirement that the 'zero average' grating function (function minus the zero order term) has only two zero crossings in any interval of length $\Lambda$. This requirement is equivalent to having $c_1 \gg \{c_m, m>1\}$. This last requirement enables us to concentrate on just two terms in the sum over grating harmonics, the m=0 and m=1 terms. For these two terms we can write:

$$I_{s,0}(t) = I_n c_0 \int_{x_1-p(t)}^{x_2-p(t)} dx r(x) \cos(2\pi n p(t)/\Lambda + \phi_n(x) - \varphi_n) \quad (12)$$

$$I_{s,1}(t) = I_n c_1 \int_{x_1-p(t)}^{x_2-p(t)} dx \cos(2\pi x/\Lambda + 2\pi p(t)/\Lambda + \psi_1) \quad (13)$$

$$r(x)\cos(2\pi n p(t)/\Lambda + \phi_n(x) - \varphi_n)$$

Attention is now focused on specific diffraction orders in the reflected and diffracted waves from the grating, the n=0 (specular reflection) and n=±1 directions.

For the specular reflection term, the m=0 contribution is:

$$I_{s,0}(t) = I_0 c_0 \int_{x_1-p(t)}^{x_2-p(t)} dx r(x) \cos(\phi(x)) \quad (14)$$

For a diffuse surface with constant brightness this term will be nearly constant, and will change slowly as and when the average reflection from the surface changes. The m=1 term is:

$$I_{s,1}(t) = I_0 c_1 \int_{x_1-p(t)}^{x_2-p(t)} dx \cos(2\pi x/\Lambda + 2\pi p(t)/\Lambda + \psi_1) \quad (15)$$

$$r(x)\cos(\phi(x))$$

$$= \cos(2\pi p(t)/\Lambda) I_0 c_1 \int_{x_1-p(t)}^{x_2-p(t)} dx$$

$$= \cos(2\pi x/\Lambda + \psi_1) r(x) \cos(\phi(x)) - \sin(2\pi p(t)/\Lambda) I_0 c_1$$

$$\int_{x_1-p(t)}^{x_2-p(t)} dx \sin(2\pi x/\Lambda + \psi_1) r(x) \cos(\phi(x))$$

$$\equiv \cos(2\pi p(t)/\Lambda) I_c(t) + \sin(2\pi p(t)/\Lambda) I_s(t)$$

$$\equiv I(t) \cos(2\pi p(t)/\Lambda + \vartheta(t))$$

where the intensity I(t) and phase θ(t) result from integrals over random variables corresponding to the amplitude and phase reflection of the diffuse surface at a spatial frequency $1/\Lambda$. For diffuse surfaces with single reflectors larger than the spatial wavelength $\Lambda$ the contribution will come from grain boundaries, while for diffuse surfaces having small particle sizes there will be strong contributions for all spatial frequencies up to 1/d, where d is the average particle size.

The rate of change of these "random walk" variables depends on the average time it takes a given set of reflection centers $\{x_i\}$ to be replaced by a new set, which in turn is related to the change of the integration region above, $\tau \approx (x_1-x_2)/v = L/v$, where v is the instantaneous velocity and L is the illuminated size of the grating. If a large number of grating periods are illuminated such that $L \gg \Lambda$, the result is fast oscillations with a slowly varying statistical amplitude and phase. The error of the translation measurement is proportional to $\Lambda/L$ and is independent of the velocity.

In summary, for specular reflection translation measurement:

1. The measured signal at the detector output oscillates at a frequency of $v/\Lambda$. Detection and counting of the zero crossing points of this signal gives a direct translation measurement, each zero crossing corresponding to a $\Delta p=\Lambda/2$ translation, provided that the translation direction does not change during the measurement.
2. The measured signal's amplitude and phase are slowly varying statistical ensemble sums. The relative accuracy of the measurement is proportional to $\Lambda/L$, L being the illuminated grating size.
3. The spacing between the surface and the grating should preferably be smaller than both the near field distance, $\approx \Lambda^2/4\lambda$, and the coherence length of the light reaching the detector, $\approx \lambda^2/\Delta\lambda$.

The first order reflection, unlike the specular reflection, carries also a Doppler phase shift. Looking again at the contribution of the m=0, 1 spatial frequency components gives:

$$I_{s,0}(t) = I_1 c_0 \int_{x_1-p(t)}^{x_2-p(t)} dx r(x) \cos(2\pi p(t)/\Lambda - \phi_1(x) - \varphi_1) \quad (16)$$

$$I_{s,1}(t) = I_1 c_1 \int_{x_1-p(t)}^{x_2-p(t)} dx \cos(2\pi x/\Lambda + 2\pi p(t)/\Lambda + \psi_1) \quad (17)$$

$$r(x)\cos(2\pi p(t)/\Lambda + \phi_1(x) - \varphi_1)$$

Using a decomposition of the cosine term in (16) as in (15) results in:

$$I_{s,0}(t) = I_0(t) \cos(2\pi p(t)/\Lambda + \Phi_0(t)) \quad (18)$$

In a similar manner the expression for the m=1 term, (17) is:

$$I_{s,1}(t) = I_1(t) \cos(4\pi p(t)/\Lambda + \Phi_1(t)) \quad (19)$$

Equation (19) neglects a slowly varying term that adds to the average detector signal (the "DC" component). An analysis of equations (16)–(19) shows that if $c_0 \gg c_1$, the zero crossings of the signal correspond to $\Delta p = \Lambda/2$, while if $c_0 \ll c_1$, zero crossings correspond to $\Delta p = \Lambda/4$. This result can be expanded to other reflection orders n>1, where, if $c_0 \gg c_1$ the measured signal will oscillate according to $np(t)/\Lambda$. For $|n|>1$, the $c_1$ term amount to oscillations in two side bands around the $c_0$ oscillations as in amplitude modulation of a higher frequency signal. Notice that the m=0 term does not require near field conditions, so by fixing the distance to the moving surface so it is larger than the near field limit $\approx \Lambda^2/4\lambda$ but smaller than the coherence length $\approx \lambda^2/\Delta\lambda$, the m=0 contribution is dominant. Alternatively, a transmission function for the grating such that $c_0 \gg c_1$ even in the near field can be used.

The frequency associated with the $c_0$ oscillations depends on the transverse as well as axial (perpendicular) translation component (not shown in the above mathematical development). Conversely, the amplitude modulation (through the $c_1$ component) depends solely on the transverse component. When the frequency of the $c_0$ oscillations is sufficiently high, this frequency can be measured by the frequency-related technique described above, simultaneously with the detection of the amplitude modulation frequency to measure the transverse translation component. In this way, 2-D translation measurement (including motion perpendicular to the plane of the surface—i.e., axial translation) may be achieved using a single detector.

By frequency biasing the reference signal, the ratio between the carrier frequency and the amplitude modulation frequency can be made large, improving the measurement accuracy as well as allowing for detection of the direction of translation. Also, using specular reflection from the grating as a local oscillator enables a clear distinction to be made between the transverse translation component (indicated by the amplitude modulation) and the axial translation component (indicated by the phase or frequency shift of the carrier frequency).

Furthermore, the phase shifting may be combined with an asymmetric transmission pattern of the grating (e.g.—sawtooth pattern) for the purpose of transverse translation direction detection. Alternatively, the grating may be displaced for direction detection in the two dimensions.

In essence, for the non-specular diffraction embodiments of the invention, two quasi-plane waves are selected for detection by the detector. One of these waves is the result of the nth order diffraction from the grating. The second plane wave is generated by the selection of one plane wave (by the spatial filter) from the reflections from the surface.

In summary for translation measurement using non-specular diffraction (and assuming constant velocity for clarity of the discussion):

1. The measured signal at the detector output oscillates at a frequency of $n\text{v}/\Lambda$, where n is the order number. Detection and counting of the zero crossing points of this signal gives a direct translation measurement, each zero crossing corresponding to $\Lambda/2n$ translation provided that the translation direction is not switched during the measurement.
2. The measured signal's amplitude and phase are slowly varying statistical ensemble sums. The relative accuracy of the measurement is proportional to $\Lambda/nL$, L being the illuminated grating size.
3. The distance between the surface and the grating should preferably be smaller than the coherence length of the light reaching the detector, $\approx \lambda^2/\Delta\lambda$.

Even though the absolute time-varying translation |p(t)| can be measured very accurately its direction is preferably determined using one of the methods described below.

In one preferred embodiment of the invention, direction may be determined by applying an additional phase shift between the reference (local oscillator) field and the reflected field. This additional phase shift can be manifested, for example, by moving the grating towards or away from the surface. This movement does not change the phase of the field incident upon the surface, so that the reflected field is identical to that given above. The local oscillator field, however, acquires an additional phase shift due to this translation that depends on the grating displacement d(t).

Keeping the distance between the grating and the surface almost constant and introducing a fixed frequency shift between the reflected and local oscillator fields can be achieved by making d(t) a periodic saw-tooth function:

$$d_n(t) = D_n \int_0^t \left[ \tau^{-1} - \sum_{k=0}^{\infty} \delta(t' - k\tau) \right] dt' \quad (20)$$

$$D_n = \frac{\lambda}{1 + \sqrt{1 - \left(\frac{n\lambda}{\Lambda}\right)^2}}$$

with $\tau$ as the cycle time for the saw-tooth, fixing the amplitude of the saw-tooth to give $2\pi$ phase shift (or multiples of $2\pi$) for reflection at the nth diffraction order. The frequency shift due to this motion is $\tau^{-1}$, and if $\tau^{-1} > n\text{v}/\Lambda$ is maintained, the direction of the motion is determined without ambiguity according to the frequency of oscillation of the detector signal, namely $\tau^{-1} + n\text{v}/\Lambda$. Alternatively, the translation (both positive and negative) is determined directly by counting the zero crossing in the detected signal and subtracting it from the result of a simultaneous count of the oscillator frequency $\tau^{-1}$.

If the saw tooth amplitude is not ideal, (i.e., it does not correspond to integer multiples of the wavelength) the direction can still be determined, however, the formulation is more complicated. As used herein, the term "saw-tooth" includes such non-ideal variations.

An alternative way of introducing a periodic phase shift between the local oscillator field and the field reflected from the surface is to modulate the optical path length between the grating and the surface. This is preferably achieved by a transparent piezo-electric element mounted between the grating and the surface.

An alternative methodology to break the symmetry between positive and negative relative translation, so that the translation direction can be detected, is to use an asymmetric function for the transmission (amplitude and/or phase) function of the grating. For simplicity, the formalism is developed for an amplitude grating. For simplicity, assume that the grating is large compared to the line spacing along the translation axis and that k point scatterers are illuminated through the grating. Scatterers entering or leaving the illuminated area are neglected (this will appear as a noise factor in a comprehensive treatment). After the interference with the local oscillator (which is not shifted here) and filtering the optical frequencies, the resulting signal can be written as:

$$I_s(t) = I_n \sum_{i=1}^{k} r_i A(x_i + p(t)) \cos(2\pi n p(t)/\Lambda + \phi_i) \quad (21)$$

where $r_i$, $x_i$ and $\Phi_i$ are the reflectance, the position (at time t=0) and the relative phase (with respect to the local oscillator), respectively, of a scatterer i. For a diffuse body these are all random variables. This presentation of the detector signal is used for the following direction-detection mechanisms.

For specular reflection:

$$I_s(t) = I_0 \sum_{i=1}^{k} r_i A(x_i + p(t)) \cos(\phi_i) \quad (22)$$

Assuming that p(t)=vt. i.e.—changes in the surface velocity are relatively small during the integration time used for determination of the translation direction. Thus, the first and second derivatives of the received signal are:

$$I'_s(t) = I_0 v \sum_{i=1}^{k} r_i \cos(\phi_i) \frac{d}{dx}(A(x_i + vt)) \quad (23)$$

$$I''_s(t) = I_0 v^2 \sum_{i=1}^{k} r_i \cos(\phi_i) \frac{d^2}{dx^2}(A(x_i + vt)) \quad (24)$$

Assume that A(x) is constructed such that $$\frac{d^2 A(x)}{dx^2} = \eta \frac{d A(x)}{dx}.$$

In this special case it is evident that: $I_s''(t) = \eta v \cdot I_s'(t)$. Thus, the magnitude, and more importantly, the sign of the translation velocity (i.e.—the translation direction) can be derived from the ratio between the first and second time-derivatives of the detector signal.

If the velocity cannot be assumed to be constant during the direction-decision integration time, then the derivatives may be performed with respect to the measured translation (which is known from the zero-crossing or from another detector with higher accuracy operated in parallel). If only the direction is required (and not the velocity magnitude), it is sufficient to check if the first and second derivatives carry the same sign (one direction) or not (opposite direction). A simple XOR (exclusive OR) operation after sign-detection of the derivatives will be "1" if the sign of η is opposite to the sign of v and "0" if they are the same.

An example of A(x) that satisfies the constant derivative ratio is a combination of exponents like:

$$A(x) = \begin{cases} A(1 - e^{-\gamma(x-j\Lambda)/\Lambda}): & \text{if } j\Lambda \leq x < \Lambda(j+1/2) \\ A(e^{-\gamma(x-(j+1/2)\Lambda)/\Lambda} - e^{-\gamma/2}): & \text{if } \Lambda(j+1/2) \leq x < \Lambda(j+1) \end{cases} \quad (25)$$

where the pattern is repetitive with a cycle Λ. It is evident that for this pattern the first and second (and in fact all) derivatives have a constant ratio as required, of η=−γ/Λ. But, the singularity points in multiples of Λ/2 introduce "noise" to the measurement. These singularities increase the error probability as the number of scatterers grow, since each one will appear in the received signal when a scatterer passes across it. The relative noise contribution is reduced as the direction detection integration time increases.

Figure 2:
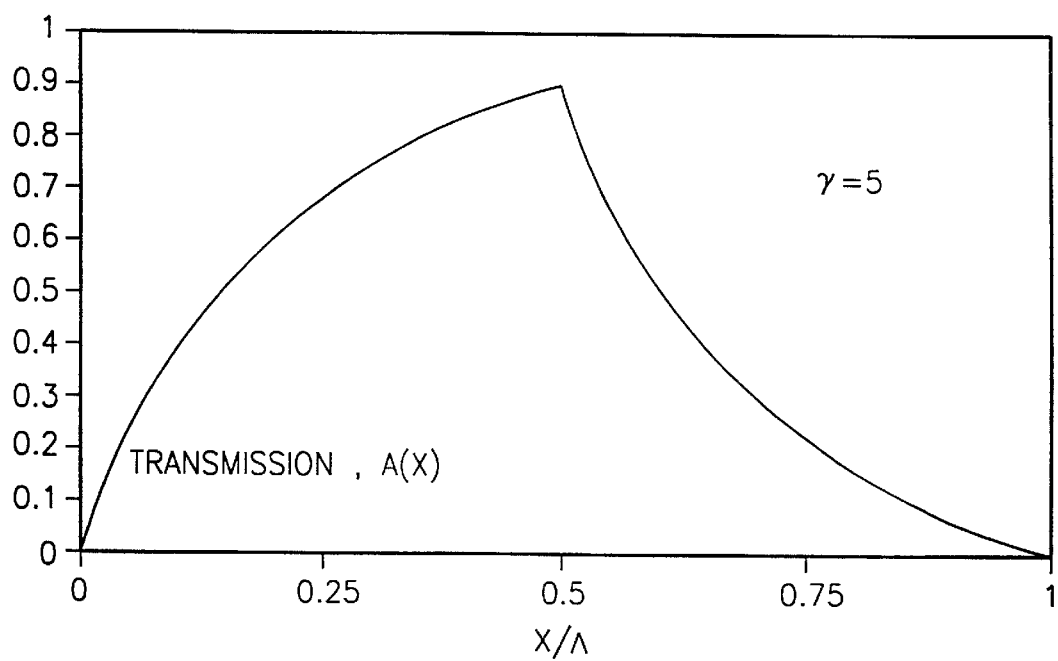
FIG. 2 is a graph of a grating transmission function, in accordance with a preferred embodiment of the invention.

The pattern is assumed to be the intensity of illumination on the surface. Thus, the requirement for the near field is more stringent than the similar requirement for measuring translation magnitude alone in n=0 specular reflection. An assumed transmission pattern is shown in FIG. 2, for γ=5. This can be achieved by having a partially reflecting/transmitting property for the grating, having an amplitude transmission function such as that shown in FIG. 2.

A relaxed requirement from the transmission pattern is that the derivatives will have a constant sign relationship (i.e.—they are not exactly proportional, but their ratio's sign is constant along the pattern). Here, direction-detection is still assured for a single scatterer, but the error probability is higher than in the former case as the number of scatterers gets larger (even without the effect of the singularities).

A similar analysis is possible for high-order reflection (|n|>>1). Again, for simplicity the surface is assumed to move with a constant velocity, v. Equation (21) can be looked at as a sum of amplitude-modulated signals of a carrier with frequency nv/Λ.

A(x) is now assumed to be asymmetric (e.g.—sawtooth waveform). For |n|>>1, the detector's signal envelope matches the transmission function for translation in the "positive" direction and is the inverse image the other way. Thus, if the number of scatterers is small (the limit being dependent on the grating order n), the translation direction is represented by the sign of the first derivative of the detected signal's envelope. In addition, the magnitude of the envelope derivative is proportional to the magnitude of the translation velocity.

An asymmetric transmission pattern enables direction detection for speckle velocimetry. The detector signal resulting from a random speckle pattern, filtered by a grating with intensity transmission pattern A(x) adjacent to the detector, can be represented as:

$$I_s(t) = I_0 \sum_{i=1}^{k} r_i A(x_i + p(t)) \quad (26)$$

where $r_i$ and $x_i$ are the intensity and position of the i-th "speckle", respectively, and p(t) the surface translation. Assuming constant velocity, p(t)=vt, the detector signal time derivative is:

$$I'_s(t) = I_0 v \sum_{i=1}^{k} r_i \frac{d}{dx}(A(x_i + vt)) \quad (27)$$

The intensities $r_i$ are positive values. Thus, if dA/dx is constant, then the derivative of the detector signal is indicative of the translation direction. Such a pattern is accomplished using sawtooth transmission pattern. The discontinuities in the pattern add noise to the measurement, requiring the use of an appropriate integration interval in order to limit the error probability. The motion velocity is determined from the frequency of oscillations of the detector signal.

Of course, it is possible to utilize mechanical or other means (e.g.—an accelerometer) to determine the direction of motion as a complementary component in an OTM device.

As was noted above, fluctuations in the source amplitude are directly transferred to the received signal via the local oscillator field. In order to minimize such noise, in accordance with a preferred embodiment of the invention, a signal proportional to the source amplitude is detected and the resulting signal (termed the "compensation" detector and signal) is subtracted from the detector signal. This detection can be performed, for example, by:

Splitting the source beam with a beamsplitter (which need not be accurately aligned) and directing the diverted beam to the compensation detector, or Directing any of the light beams reflected from the grating to a compensation detector without spatial-filtering it (but potentially with considerable attenuation). Conveniently this may be one of the grating orders not used for the spatial filter measurement. e.g.—use order 1 for spatial filter and order 0 for source-noise compensation.

The output of the compensation detector is amplified (or attenuated) so that the resulting difference signal is as close to zero as possible when the surface is not moving relative to the device (or when the "window" is closed with an opaque cover), thus compensating for the $E_0^2$ factor.

In order to compensate for the $E_0$ multiplier of the $E_r$ component, the signal from the compensation detector may be the control voltage of a gain-controlled amplifier in one of the stages of the signal amplification (after the first compensation by subtracting the $E_0^2$ component). The gain should be approximately proportional to the inverse of the square-root of the compensation signal.

Figure 3A:
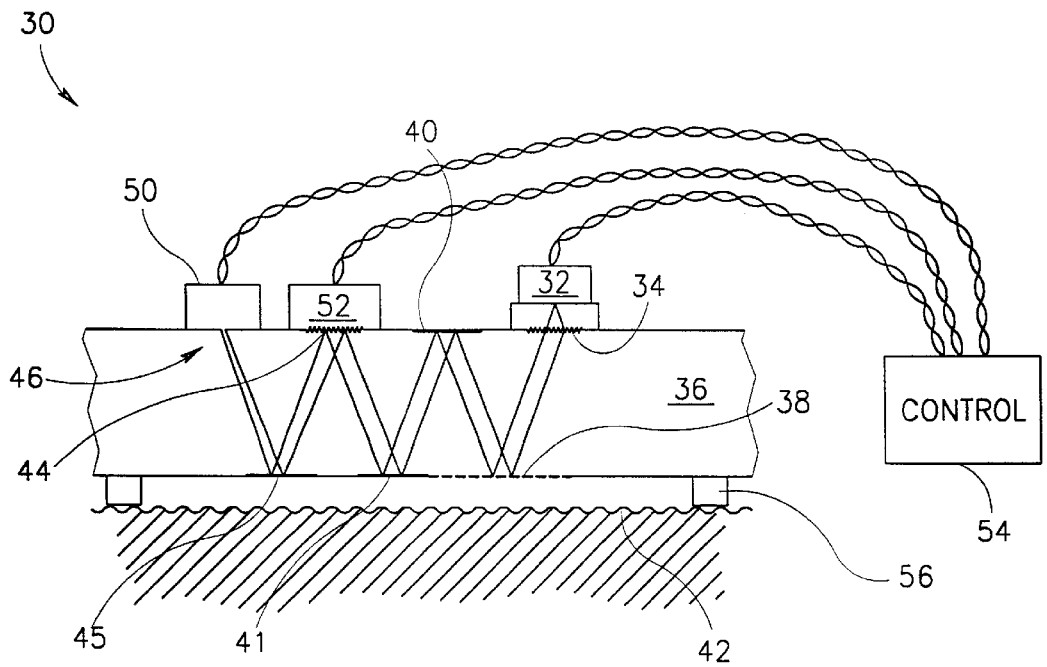
FIGS. 3A, 3B and 3C are schematic representations of preferred embodiments of integrated motion transducers, in accordance with preferred embodiments of the invention.

FIG. 3A shows a preferred implementation of a translation detector, in accordance with a preferred embodiment of the invention, in which zeroth order detection is used and which does not incorporate direction detection, or in which the detection of the direction is based on an asymmetric grating transmission pattern and appropriate signal analysis. FIG. 3A shows an integrated optical chip translation device 30 which is suitable for mass production. It utilizes only a few components that can be manufactured in large quantities for a low price. Device 30 comprises a laser diode 32, preferably a single transverse mode laser. Laser light from laser diode 32 is preferably collimated by a lens 34, which is preferably a diffractive collimating lens, etched into or deposited onto the surface of an optical chip substrate 36 of glass, quartz or the like, preferably coated with non-reflective layers on both sides other than in designated areas. A grating 38 preferably, either an amplitude or phase type grating is mounted on optical chip substrate 36. Grating 38 is preferably etched or deposited onto the lower surface of substrate 36. Light reflected by the grating and light reflected from a surface 42 is reflected by two reflective surfaces 40 and 41 and focused by a lens 44, preferably a reflective diffractive focusing lens, etched into the surface of optical chip substrate 36. After further reflection by a reflective surface 45, a pinhole 46, formed in a reflective/opaque layer formed at the focus of lens 44, passes only a plane wave from surface 42 and the reflected light from grating 38 to a detector 50, for example a PIN photo diode or similar device. A compensating detector 52 is preferably placed behind lens 44 detects a portion of the light reflected by grating 38. A controller 54, comprising a laser diode driver/modulator for activating laser diode 32, detection amplifiers and zero crossing counting circuits or frequency detection means used for determining the translation velocity and translation of the surface. Compensation detector supplies a compensation signal proportional to the amplitude of the local oscillator for reducing any residual effects of variations in the laser output. For reduction of noise, twisted wire pairs, shielded wires or coaxial cable are preferably used to carry signals to and from controller 54. Preferably, the apparatus is provided with legs or a ring support 56 or other such means on which the device rides on surface 42 to avoid damage to grating 38 and to keep the distance between the grating and the surface fairly constant.

Figure 3B:
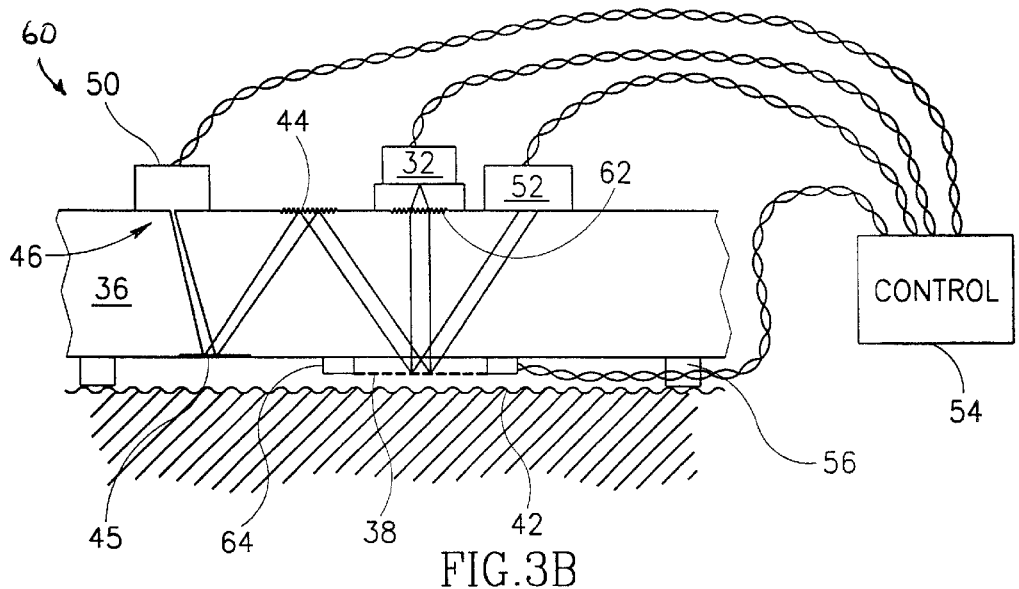

FIG. 3B shows an alternative preferred embodiment of the invention including direction detection by phase shifting of the local oscillator and utilizing first order diffraction from the grating. Elements which are functionally the same as those of FIG. 3B are given the same reference numerals in both FIGS. 3A and 3B. FIG. 3B shows a device 60 in which light from laser diode 32 is collimated by a lens 62 to strike a grating 38. Grating 38 is preferably mounted on a piezoelectric ring 64 (which is in turn mounted on optical substrate 36). Excitation of ring 64 adds a variable phase to the local oscillator (the light diffracted from grating 38) in order to allow for direction detection, as described above. In the embodiment shown in FIG. 3B, both the detection of the signals used for translation and direction detection on the one hand and for compensation detection on the other hand, are based on first order diffraction by grating 38, but with opposite sign. Preferably, anti-reflection coatings are used, where appropriate, to reduce unwanted reflections.

An integrated optical chip is the preferred implementation scheme since it can be manufactured in large volumes for a low cost. The figure shows only one detector for a single direction, with preferably a second detector measuring the orthogonal direction. All of the optical elements—lenses, grating, mirrors and pinholes—are etched into or deposited onto the optical substrate and are either reflective or transmissive according to functionality. The discrete components in the system—laser diode, detector and piezoelectric transducer—are mounted on top of the chip. The electronic elements of controller 54 may also be manufactured or placed on top of the chip.

It should be understood that the features of FIGS. 3A and 3B can be mixed and combined. For example if, in FIG. 3A, grating 38 is mounted on a transducer such as ring 64, then the result would be a device operating in the specular reflection (zeroth order) mode with increased dynamic range and possibly additional axial translation detection. Furthermore, it is possible to use an asymmetric grating in place of grating 38 and ring 64 of FIG. 3B for the purpose of direction detection. For these and other preferred embodiments of the invention, combining various aspects of the invention will occur to persons skilled in the art.

Figure 3C:
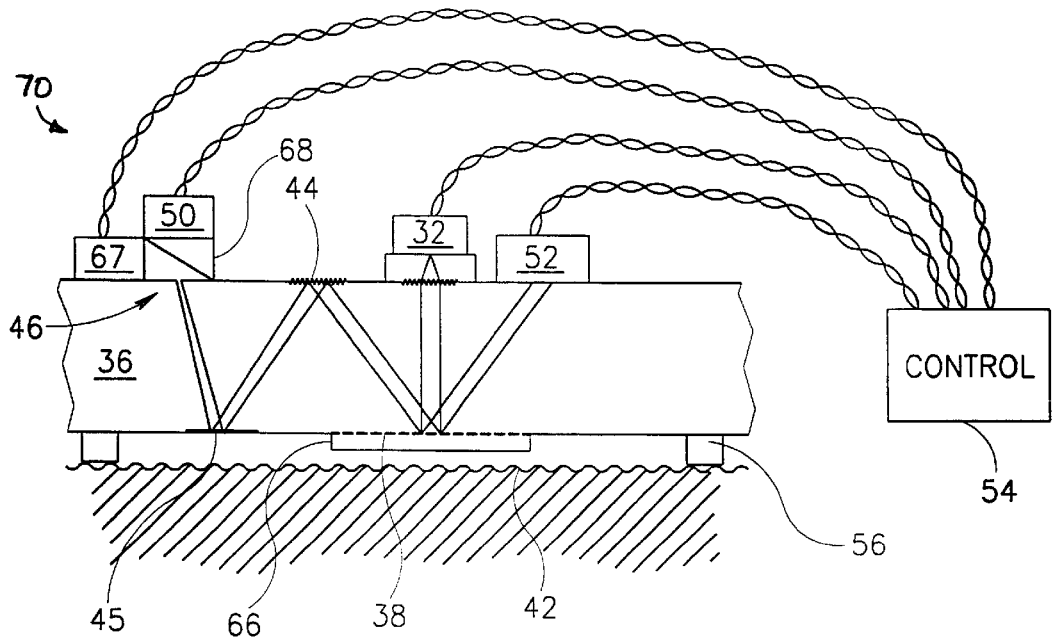

FIG. 3C shows yet another method of determining direction, in accordance with a preferred embodiment of the invention. The device 70, shown in FIG. 3C is similar to device 60 of FIG. 3B except that grid 38 is placed at the lower surface of chip 36 and piezoelectric ring 64 is replaced by a birefringent plate 66. Source 32 produces linearly polarized light having a polarization which is at an angle of 45 degrees with the birefringent axis of plate 66. Radiation which is reflected from the surface passes through plate 66 twice and consists of two waves, each having a polarization direction at a 45 degree angle with that of the radiation reflected from or diffracted from grating 38. These waves are also at substantially a 90 degree phase difference with each other (depending on the properties of the surface).

In addition, a polarizing beam splitter 68 is preferably placed before detector 50. Its axis is such that one of the two halves of the reflected radiation passes through beam splitter 68 to detector 50 and the other half is reflected to a detector 67. In addition, beam splitter 68 directs half the radiation reflected or diffracted from grating 38 to each of detectors 50 and 67. The resulting signals detected by detectors 67 and 50 will have a phase difference of 90 degrees. The sign of the phase difference can be used to determine the direction of motion.

Figure 4:
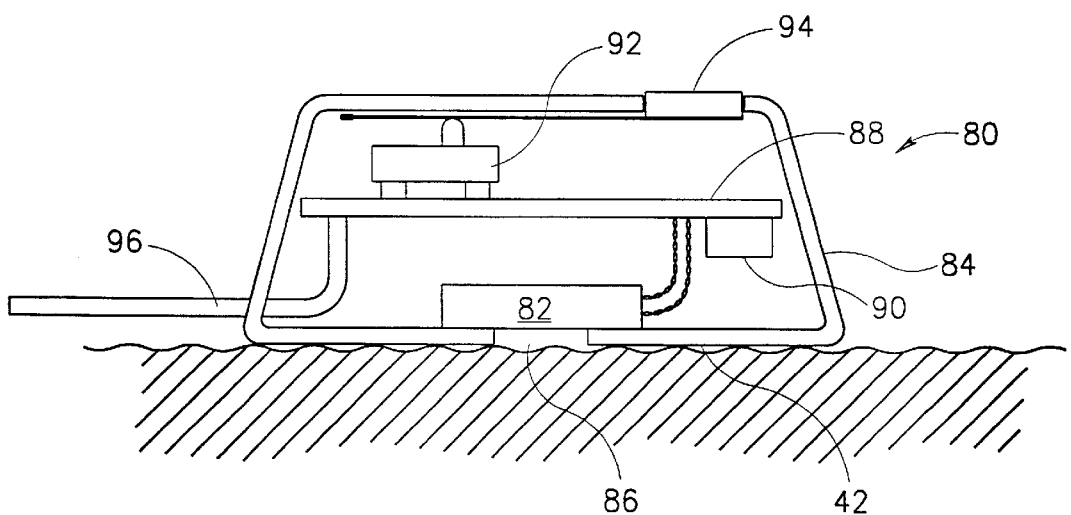
FIG. 4 is a schematic diagram of an optical mouse in accordance with a preferred embodiment of the invention.

While the present invention is described above in various embodiments for solving the general problem of translation measurement, the methodology is applicable to a large number of products. One particular application of the optical translation measurement method of the invention is a novel optical cursor control device (mouse) which derives its translatatory information from movement on substantially any diffuse surface, such as paper or a desktop. One design for such a device, in accordance with a preferred embodiment of the invention, is shown in FIG. 4. An optical mouse 80 comprises an "optical chip" 82 which is preferably a device such as device 30 or device 60 or a variation of these devices. Chip 82 is mounted in a housing 84 and views paper 42 through an optical aperture 86 in housing 84. Input and output leads from chip 82 are preferably connected to a printed circuit board 88 or the like on which are mounted electronic circuitry 90 corresponding to the controller of devices 30 or 60. Also mounted on PC board 88 are one or more switches 92 that are activated by one or more push-buttons 94 as in conventional mice. The mouse is conventionally connected to a computer via a cable 96 or with a wireless connection.

The method of measurement in accordance with preferred embodiments of the invention described above allows for a wide dynamic range of translation velocities, covering all the required range for normal operation of a mouse. Such a device can be characterized as a 'padless optical mouse' to provide orthogonal signals to move a cursor from position to position on a display screen in response to movement of the mouse over any sufficiently diffusely reflective surface, such as paper or a desk top. Thus, special contrasting markings or special patterns are not necessary.

Mouse systems usually use mechanical transducers for the measurement of hand translation over a surface (commonly a "mouse pad"). A need for moving-parts-free, reliable and accurate translation measurement technology for use in mouse systems is well acknowledged today. A few optical devices were developed, but still suffer from various deficiencies, such as a need for a dedicated patterned pad, low transducing performance or high cost.

An optical padless mouse according to one preferred embodiment of the invention can be used in two ways, according to the user's convenience. It can be used as a "regular" mouse, whereby the mouse is moved on top of a surface, and its motion relative to that surface is measured. It can also be flipped over, if so desired, and instead used by moving the finger along the device aperture. The motion of the finger relative to the mouse body, which is now stationary, will be measured.

Figure 5A:
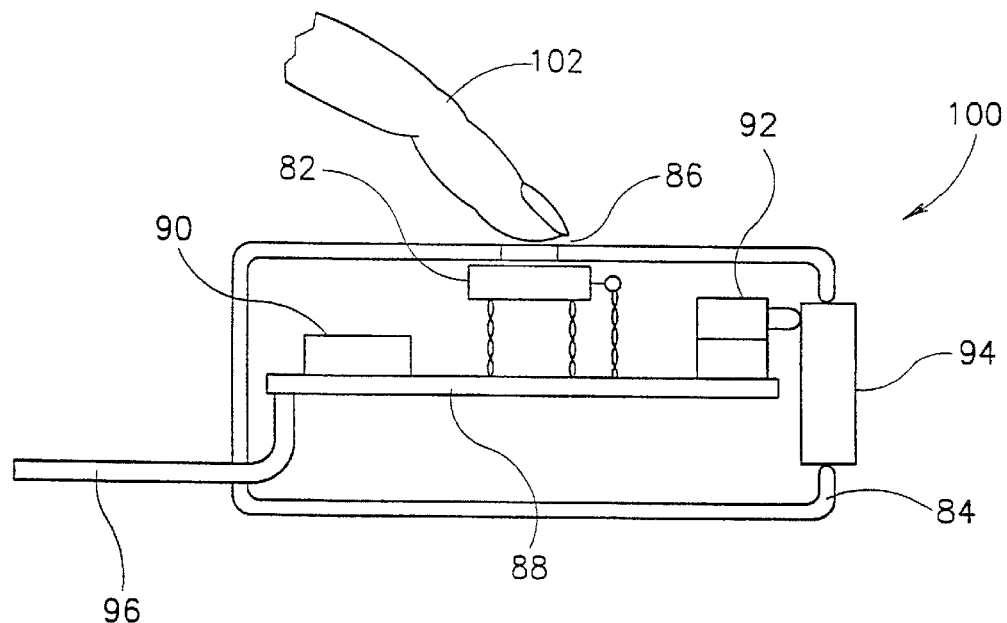
FIGS. 5A and 5B are schematic diagrams of a mouse/finger translation measurement device, in accordance with a preferred embodiment of the invention.
Figure 5B:
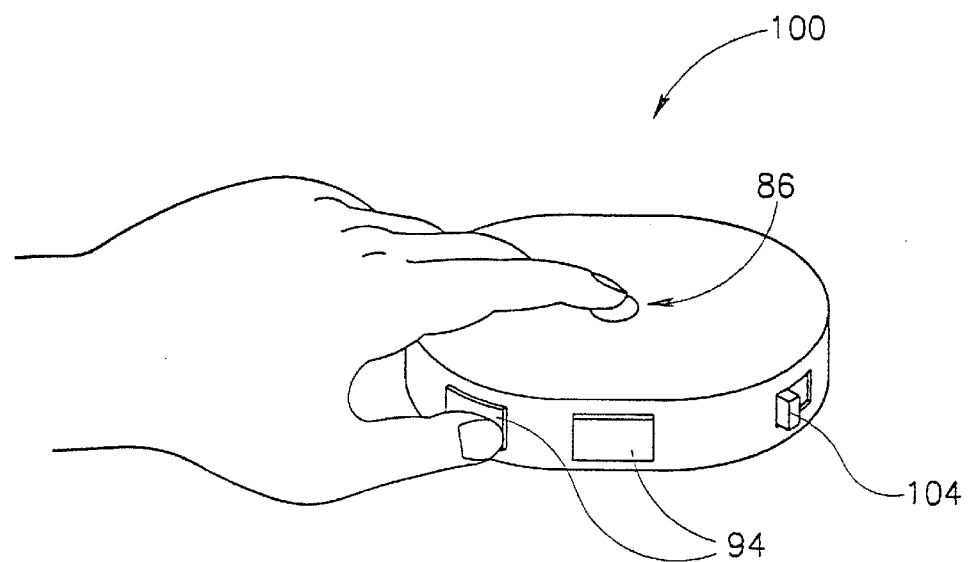

One such device 100 is shown in FIGS. 5A and 5B. FIG. 5A shows that structurally the device is similar to that of FIG. 4 (and the same reference numbers are used in the two Figs. for ease of comparison), except that buttons 94 are on the side of housing 84 in device 100. In the mode shown in FIG. 5A device 100 is stationary and it is used to track the movement of finger 102 of an operator. It should be clear that device 100 can be turned over and used as a mouse, in much the same way as the mouse of FIG. 4. FIG. 5B shows a perspective view of the device, showing an optional switch 104 which is used to indicate if device 100 is used as an ordinary mouse or in the mode shown in FIGS. 5A and 5B. Alternatively, such a switch may be a gravity switch mounted in the device to automatically switch modes. It is generally desirable to know in which mode the device is operating since the direction of motion of the cursor is opposite for the two modes and usually, the sensitivity desired is different for the two modes.

Furthermore, using a translation measurement device with a small aperture, as in the present invention, and moving a finger along its aperture, enables moving a cursor through measurement of the translation of the finger, much like a touch pad. This function may be termed "touch-point" and may be used in dedicated minute locations on keyboards as well. This device would be identical to the device of FIG. 5 except that the optical chip would be mounted in the keyboard as would the switches. Also, an OTM "touch-point" may be used on the top of the mouse as an alternative to a scrolling wheel. "Clicks" may be detected, for example, by bringing the finger into and out of range of the touch point.

This device can be used to replace pointing devices other than a mouse. For example, pointing devices used in laptop or palmtop computers. Virtually any one or two dimensional motion can be controlled using such a device.

Currently, laptop computers pointing devices employ either a track ball, a touch pad, a trackpoint (nipple) or an attached mouse. These devices carry diverse drawbacks. In particular, the track ball collects dust much like a regular mouse, the touch pad is sensitive to dampness and was hailed unfriendly by many users, the trackpoint drifts when it should be idle and the attached mice are delicate and require a desktop to work on.

The touch-point device is small in size, its working aperture can be less than 1 mm$^2$ and it provides high resolution and dynamic range. This makes it an ideal solution as a pointing device to be embedded in a laptop computer. The device is operated by moving a finger across the face of the aperture, in a somewhat similar manner to the use of a touch pad. The difference being, that the aperture is very small in size compared to the touch pad, it is free of problems like humidity and dampness and its reliability is expected to be high. In fact, even several devices can be easily embedded in a single laptop or a palm top, including on keys, between keys, or next to the screen. Additionally, a pressure sensitive device may be included under the touch point device and the sensitivity of the touch point made responsive to the pressure of the finger on the touch point.

In a preferred embodiment of the invention, two touch points are provided, a first touch point and circuitry which moves a pointer responsive thereto and a second touch point and circuitry which causes scrolling responsive thereto.

Figure 6:
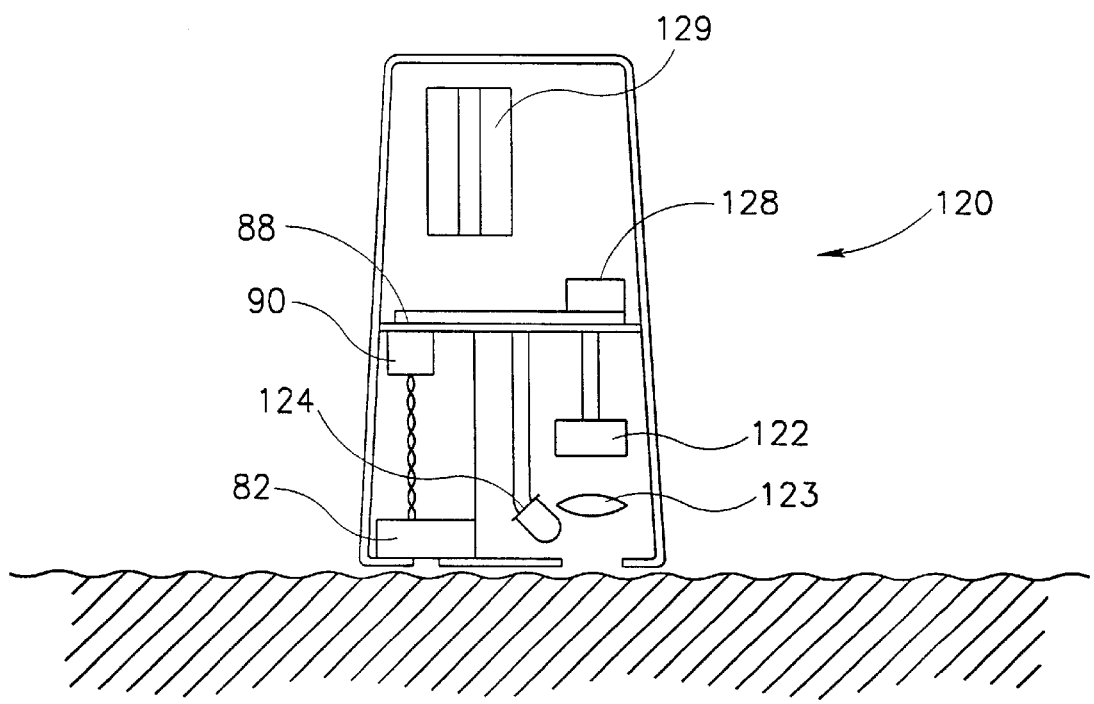
FIG. 6 is a schematic diagram of a scanning pen in accordance with a preferred embodiment of the invention.

In a further preferred embodiment of the invention, the present invention can be used as an improved translation and/or velocity measurement system for a scanning-pen, capable of scanning lines of text (or any other pattern) and storing them, for downloading later to a PC, and/or for conversion to ASCII code using OCR software. An example of such a device is shown in FIG. 6. A scanning pen 120 comprises a 'reading' head with a one dimensional or two dimensional array of photo detectors (CCD array) 122 and a lens 123, wide enough to scan a typical line height, and a lighting source 124 as in conventional light pens. The pen head also contains an optical translation measurement system 82 in accordance with the invention, for one or two axes measurement of the translation of the pen head across the scanned paper and possibly another one to extract rotation information. The pen can then either store the scanned line as a bitmap file (suited for hand-writing, drawings etc.) or translate it immediately through using internal OCR algorithm to binary text. The stored information may be downloaded later to a computer, palntop or phone, etc. For this purpose and for the powering and control of the various devices in pen 120, it is provided with a controller or microprocessor 128 and batteries 129.

The optical translation method of the present invention allows for this device to be small in size, convenient to use, and accurate. The high accuracy results from the inherent high accuracy of the method with respect to current mechanically-based translation transducers and from the ease of measurement in two dimensions plus rotation. Similar commercial devices today use a patterned wheel which is pushed against the scanned surface while scanning and rolled in order to measure the translation by detecting the rolled angle of the wheel. This technique only detects the location along the line and not along its vertical axis and its relatively low accuracy limits the range of applications it can be used for.

A further preferred application of the optical translation method and device of the present invention is a portable or a fixed device, for scanning signatures and relaying them to an authentication system. Similar in principal to the scanning pen, the signature reader contains a 'reading' head, with a one dimensional or two dimensional array of photo detectors (CCD array) It has an aperture wider than that of the scanning pen, to be able to read wider or higher signatures and contains an optical translation measurement device, for detection of the two axes translations of the hand or instrument which is moving the device across the scanned signature. The signature reader does not contain any OCR, as no text files are to be created. Instead, it is connected (through direct, hardwire line or wireless link, or through an off-line system), to an "authentication center", where the scanned signature is compared to a "standard signature" for validation. This device can be accurate, while cheap, small and easy to use.

Figure 7:
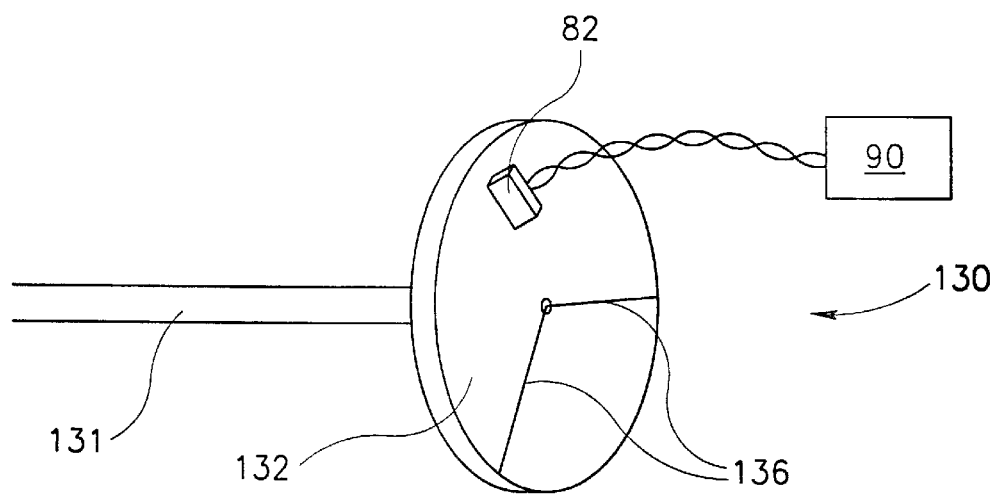
FIG. 7 is a diagram of a rotary encoder, in accordance with a preferred embodiment of the invention.

A still further application of the devices and methods described above is in the field of encoders. The present invention can replace linear encoders and angular encoders, which generally require highly accurate markings on either an encoder wheel or on a surface, by a substantially markless encoder. An angular encoder 130 in accordance with this aspect of the invention is shown in FIG. 7. Encoder 130 comprises a disk having a diffusely reflecting surface 132 mounted on a shaft 131. It also includes an optical chip 82 and controller 90, preferably essentially as described above. Preferably, surface 132 is marked with one or two radial marks 136 to act as reference marks for the encoder and for correction of errors which may occur in reading the angle during a rotation. This mark may be read by optical chip 82 or by using a separate detector.

A further embodiment of the invention is a virtual pen, namely a pen which translates movement across a featureless page into position readings. These position readings can be translated by a computer into virtual writing which can be displayed or translated into letters and words. The computer can then store this virtual writing as ASCII code. Transfer to the computer may be either on line (using a wired or preferably a wireless connection to the computer) or off-line wherein the code or positions are stored in the "pen" and transferred after writing is completed. This embodiment of the invention provides a compact, paper-less and voice-less memo device.

In a typical fax/printer, the paper is moved in a constant speed relative to the writing head with an accurate motor. The head releases the printed data line by line, in a correlated fashion with the speed of advancing paper. This method is both expensive, as it requires an accurate motor and mechanical set up, and inaccurate, as the paper sometimes slips in the device, thus the paper translation is not well correlated to the printing device, resulting in missed or crooked lines.

With an optical translation measuring device, it is possible to detect paper slippage, or even to eliminate the use of expensive accurate motors, by measuring the paper advancement on-line. The printing device is then coordinated with the actual translation of the paper, thus creating a highly accurate and economic system. Similarly, these principles can be applied to a desktop scanner, where the printing head is replaced by a reading head.

Figure 8:
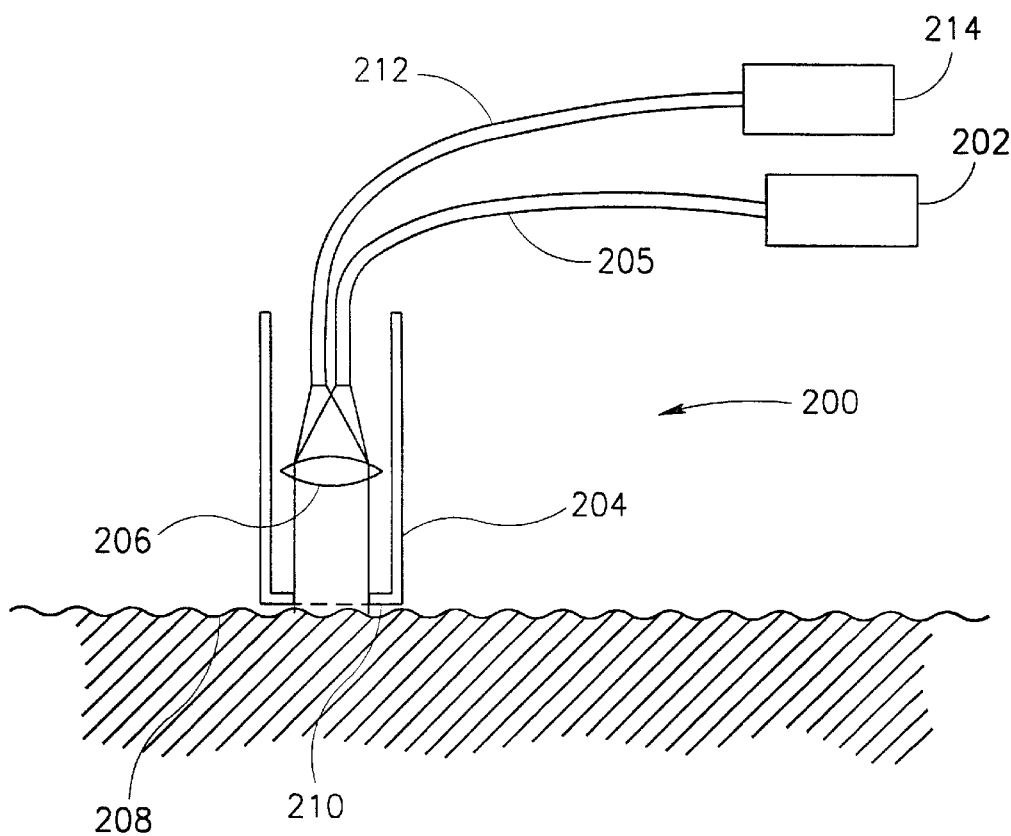
FIG. 8 is a schematic diagram of a fiber-optic-based translation measurement device, in accordance with a preferred embodiment of the invention.

FIG. 8 is a schematic of a motion sensor useful in a scanner, fax machine or printer in which motion is only in one direction. Motion detector 200 includes a source 202 which is fed to a housing 204 by a fiber optic cable 205. The output of cable 204 is collimated by lens 206 and illuminates a moving surface 208, through a grating 210. Light reflected from grating 210 and surface 208 is collected by a fiber optic cable 212 which is placed at the focal point of lens 206. The output of cable 212 is fed to a detector 214, for further processing as described above. Since the paper moves in only one direction, there is no need to detect the direction of motion of the paper.

In a preferred document scanner embodiment of the invention, the motion detector measures the relative movement of a document, preferably, without utilizing any printing on the document, while a reading head reads printed information from the document. A memory receives information from the printing head and stores it in memory locations, responsive to the measurement of movement of the document.

In a preferred printer embodiment of the invention the motion detector measures the movement of a sheet on which markings are to be made and a memory transmits commands to mark the paper, in accordance with information in the memory, responsive to the measurement of motion of the paper.

Either or both preferred scanner and printer embodiments of the invention may be utilized in a facsimile machine in accordance with preferred embodiments of the invention.

Figure 9:
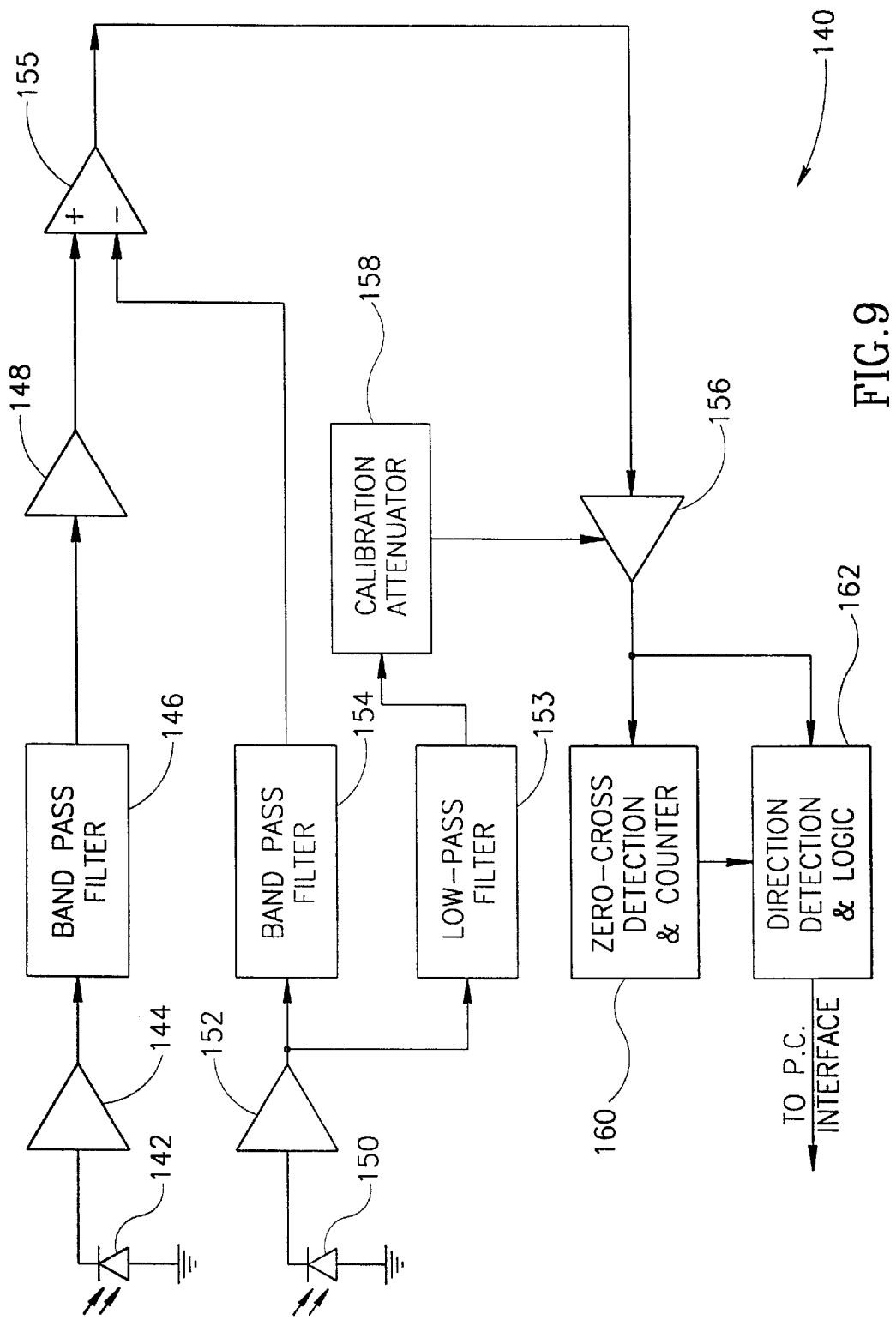
FIG. 9 is a simplified and generalized block diagram of electronic circuitry, suitable for use in preferred embodiments of the invention.

FIG. 9 is a simplified block diagram of typical electronic circuitry 140 useful in carrying out the invention. A "primary" photodetector 142 (corresponding, for example to detector 50 of FIGS. 3A and 3B) receives light signals as described above. The detector detects the light and the resulting signal is preferably amplified by an amplifier 144, band pass filtered by a filter 146 and further amplified by an amplifier 148 to produce a "primary" signal. A compensating signal as detected, for example, by photodetector 150 (corresponding to detector 52 in FIGS. 3A and 3B) is subtracted (after amplification, by amplifier 152 and bandpass filtering by filter 154) from the "primary" signal in a difference amplifier 155 to remove residual low frequency components in the primary signal. Preferably, band pass filters 154 and 146 are identical. The resulting difference signal is amplified by a voltage controlled amplifier 156 whose gain is controlled by the output of a low pass filter 153 (which is attenuated by an attenuator 158 optionally adjusted during calibration of the system). The output of amplifier 156 is fed to a zero crossing detector and counter 160 and (if a stationary non-symmetric grating is used) direction control logic 162, which determine the direction of translation of the surface. Alternatively, where a piezoelectric element 64 (FIGS. 3A and 3B) is used, a control signal corresponding to the frequency of displacement of the of the element is fed to the direction control logic 162 where it is subtracted from the zero-crossing detector count.

For preferred embodiments of the invention, the wavelength of the laser source is preferably in the infra-red, for example 1550 nanometers. A spectral width of 2 nanometers is typical and achievable with diode lasers. A source power of 5 mW is also typical. A grating opening of 1.5 mm by 1.5 mm and a grating period of 150 lines/mm are also typical. The laser source output is typically collimated to form a beam having a diameter of somewhat less than 1.5 mm and is typically incident on the grating at an angle of 30 degrees from the normal. The optical substrate may have any convenient thickness. However a thickness of several mm is typical and the focal length of the lenses used is designed to provide focusing as described above. Typically, the focal length of the lenses are a few mm. Typically, pinhole 46 (FIGS. 3A, 3B and 3C) has a diameter of several micrometers, typically 10 micrometers. It should be understood that the above typical dimensions and other characteristics are provided for reference only and that a relatively wide variation in each of these dimensions and characteristics is possible, depending on the wavelength used and on other parameters of the application of the optical chip.

The present invention has been described in conjunction with a number of preferred embodiments thereof which combine various features and various aspects of the invention. It should be understood that these features and aspects may be combined in different ways and various embodiments of the invention may include one or more aspects of the invention. The scope of the invention is defined by the following claims and not by the specific preferred embodiments described above.

As used in the following claims, the words "comprise" or "include" or their conjunctions means "including, but not necessarily limited to."

What is claimed is:

1. A method for determining the relative motion of a surface with respect to a measurement device, comprising:

illuminating the surface with incident illumination, having a coherence length, such that the illumination is reflected from portions of the surface, wherein at least part of at least one of the incident and reflected illumination passes through a partially transmitting object that is part of the measuring device;

detecting the illumination reflected from the surface, to generate a detected signal; and determining the relative motion of the surface parallel to the surface, from the detected signal, wherein the object and the surface are situated within a distance that is less than the coherence length of the detected illumination.

2. A method according to claim 1 wherein the transmission of the object is spatially varying.

3. A method according to claim 1 wherein the object is partially reflecting and wherein part of the incident illumination is reflected or diffracted by the object, as a reference illumination and wherein detection of the illumination is coherent, utilizing said reference illumination.

4. A method according to claim 2 wherein the object is partially reflecting and wherein part of the incident illumination is reflected or diffracted by the object, as a reference illumination and wherein detection of the illumination is coherent, utilizing said reference illumination.

5. A method according to claim 2 wherein spatially varying comprises periodic spatially varying.

6. A method for determining the relative motion of a surface with respect to a measurement device comprising:

placing a partially reflecting object, which is part of the measuring device, adjacent to the surface;

illuminating the object with incident illumination such that part of the incident illumination is reflected or diffracted by the object, as a reference illumination and part is reflected from the surface;

coherently detecting the illumination reflected from the surface utilizing the reference illumination, to generate a detected signal; and determining the relative motion of the surface parallel to the surface, from the detected signal;

wherein the surface has no markings indicating position.

7. A method according to claim 6 wherein the object is a partially transmitting object and wherein at least part of at least one of the incident and reflected illumination passes through the object.

8. A method according to claim 7 wherein the reflection of the object is spatially varying.

9. A method according to claim 8 wherein spatially varying comprises periodic spatial variation.

10. A method according to claim 6 wherein the reflection of the object is spatially varying.

11. A method according to claim 10 wherein spatially varying comprises periodic spatial variation.

12. A method according to any of the preceding claims wherein the object is a grating.

13. A method according to claim 12 wherein the grating is placed sufficiently close to the surface such that the surface is in the near field of the grating.

14. A method according to claim 12 wherein the grating is placed sufficiently far from the surface such that the surface is outside the near field of the grating.

15. A method according to any of claims 1–11 wherein the detected illumination is at least partly coherent.

16. A method for determining the relative motion of a surface with respect to a measurement device comprising:

placing an object comprising a grating, which is part of the measuring device, adjacent to the surface;

illuminating the grating with incident illumination such that at least part of the illumination is incident on and reflected from the surface, wherein at least one of the incident and reflected illumination passes through the grating;

detecting the illumination reflected from the surface;

generating a signal in response to the reflected illumination; and determining the relative motion of the surface parallel to the surface, from the detected signal, wherein the surface is in the near field of the grating.

17. A method according to any of claims 3, 6 or 16 wherein the illumination reflected from the surface is frequency shifted from that of illumination reflected from or diffracted by the object and wherein determining the motion comprises determining the motion based on the frequency shift.

18. A method according to any of claims 1, 6 or 16 wherein determining the relative motion comprises determining variations in the amplitude of the signal with position.

19. A method according to claim 18 wherein the motion is determined from zero crossings of the detected signal.

20. A method according to any of claims 1, 6 or 16 wherein the object has a transmission characteristic that is spatially non-symmetric and including:

determining the direction of the relative motion based on the detected signal.

21. A method according to any of claims 1, 6 or 16 and including determining the magnitude and direction of the translation utilizing two detectors which produce different detected signals depending on the direction of the translation.

22. A method according to claim 21 and including determining the direction of translation from the sign of a phase difference between the different detected signals.

23. A method according any of claims 1, 6 or 16 wherein the illumination is perpendicularly incident on the surface.

24. A method according to any of claims 1, 6 or 16 wherein the surface is an optically diffusely reflecting surface.

25. A method according to claim 1 or claim 16 wherein the surface has no markings indicating position.

26. A method according to any of claims 1, 6 or 16 wherein the illumination comprises visible illumination.

27. A method according to any of claims 1, 6 or 16 wherein the illumination comprises infra-red illumination.

28. A method according to any of claims 1, 6 or 16 and including determining motion in two dimensions transverse to the surface.

29. A method according to claim 28 and including determining motion in a direction perpendicular to the surface.

30. A scanner for reading a document by movement of the scanner over the document comprising:

an optical reading head which detects patterns on the surface of the document; and an optical detector which determines the motion of the scanner as it is translated across the surface of the document, wherein the optical detector utilizes the method of any of claims 1, 6 or 16 to determine the translation.

31. An optical mouse comprising:

a housing having an aperture facing a surface; and an optical motion detector which views the surface through the aperture, wherein the optical motion detector utilizes the method of any of claims 1, 6 or 16 to determine the translation of the housing with respect to the surface.

* * * * *